United States Patent [19]

Dübal et al.

[11] Patent Number: 5,384,168

[45] Date of Patent: Jan. 24, 1995

[54] FERROELECTRIC LIQUID-CRYSTAL DISPLAY OF HIGH CONTRAST AND BRIGHTNESS

[75] Inventors: Hans-Rolf Dübal, Königstein/Taunus, Germany; Takamasa Harada, Inzai, Japan; Heinz Rieger, Hofheim am Taunus, Germany; Norbert Rösch, Frankfurt am Main, Germany; Peter Wegener, Königstein/Taunus, Germany

[73] Assignee: Hoechst Aktiengesellschaft, Frankfurt am Main, Germany

[21] Appl. No.: 688,898

[22] Filed: Apr. 19, 1991

[30] Foreign Application Priority Data

Apr. 21, 1990 [DE] Germany ............................. 4012750

[51] Int. Cl.$^6$ ............................................. C09K 19/00
[52] U.S. Cl. .................................. 428/1; 252/299.01; 252/299.6; 359/75; 359/79; 359/100; 428/323; 428/409; 428/411.1; 428/473.5; 428/474.4; 428/480
[58] Field of Search ............. 428/1, 473.5, 474.4, 428/323, 480, 411.1, 327, 409; 359/75, 79, 100, 63; 252/299.01, 299.6; 427/434.1

[56] References Cited

U.S. PATENT DOCUMENTS

| | | | |
|---|---|---|---|
| 4,367,072 | 4/1983 | Vogtle | 436/805 |
| 4,988,795 | 1/1991 | Uekita | 427/473.5 |
| 5,009,489 | 4/1991 | Eguchi | 359/75 |
| 5,082,352 | 1/1992 | Kawagishi | 359/63 |
| 5,135,675 | 8/1992 | Murata | 252/299.4 |
| 5,167,856 | 12/1992 | Harada | 252/299.01 |
| 5,178,792 | 1/1993 | Harada | 252/299.6 |
| 5,206,751 | 4/1993 | Escher | 359/100 |

FOREIGN PATENT DOCUMENTS

| | | |
|---|---|---|
| 0362861 | 4/1990 | European Pat. Off. |
| 2240763 | 3/1975 | France |
| 2332550 | 6/1977 | France |
| 111236 | 5/1987 | Japan |

OTHER PUBLICATIONS

World Patents Index Latest, Week 8743, Derwent Publications Ltd., London, GB; AN 87-302394/43, concerning JP-A-62 211 617, published Sep. 17, 1987.
Sato et al., Jap. J. Applied Phys. 28 (Mar. 1989) 483.
Patent Abstracts of Japan, vol. 3, No. 113 (E-139), published Sep. 19, 1979.
Patent Abstracts of Japan, vol. 12, No. 104 (P-685), published Apr. 6, 1988.
Patent Abstracts of Japan, vol. 9, No. 246 (P-393)(1969), published Oct. 3, 1985.

*Primary Examiner*—Nasser Ahmad
*Attorney, Agent, or Firm*—Curtis, Morris & Safford

[57] ABSTRACT

Ferroelectric liquid-crystal display of high contrast and brightness. The use of alignment layers containing compounds having an amphiphilicity-providing effect increases the contrast and brightness of the image in FLC displays.

10 Claims, No Drawings

FERROELECTRIC LIQUID-CRYSTAL DISPLAY OF HIGH CONTRAST AND BRIGHTNESS

DESCRIPTION

Switching and display devices containing ferroelectric liquid-crystal mixtures (FLC displays) are known, for example, from EP-B 0 032 362 (=U.S. Pat. No. 4,367,924). Liquid-crystal displays are devices which, for example as a consequence of electrical actuation, modify their optical transmission properties in such a manner that incident light (which may be reflected again) is modulated in intensity. Examples are conventional watch and calculator displays or liquid-crystal displays in the OA (office automation) or TV sectors (see also Liquid Crystal Device Handbook, Nikkan Kogyo Shimbun, Tokyo, 1989; ISBN 4-526-02590-9C 3054 and the papers cited therein).

These FLC displays are constructed in such a manner that a liquid-crystal layer is surrounded on both sides by layers which are usually, in this sequence starting from the FLC layer, at least one alignment layer, electrodes and an outer plate (for example made of glass). In addition, they contain one polarizer if they are operated in "guest-host" or in reflective mode, or two polarizers if transmissive birefringence mode is used. The switching and display elements may also contain further auxiliary layers, such as, for example, diffusion barrier or insulation layers.

The alignment layers, which comprise an organic (for example polyimide, polyamide or polyvinyl alcohol) or inorganic (for example SiO) material, bring, together with a spacing between the outer plates which is chosen to be sufficiently small, the FLC molecules of the mixture into a configuration in which their longitudinal axes are parallel to one another and in which the smectic planes are perpendicular or inclined to the alignment layer. In this arrangement, the molecules, as is known, have two equivalent orientations between which they can be switched by applying a pulsed electrical field, i.e. FLC displays are capable of bistable switching. The switching times are inversely proportional to the spontaneous polarization of the FLC mixture and are in the region of microseconds.

The principal advantage of FLC displays over the LC displays which still essentially predominate in industry is regarded as being the multiplex ratio which can be achieved, i.e. the maximum number of lines which can be addressed in time-sequential mode ("multiplex mode"), which, in contrast to LC displays, is virtually unlimited in the case of FLC displays. This electrical addressing is essentially based on the pulse addressing mentioned above and described in illustrative terms in SID 85 DIGEST, p. 131 (1985).

In FLC displays, the smectic C* phase of the liquid-crystalline material is preferred due to its comparatively low viscosity and therefore short switching time.

Particularly important functional parameters of an FLC display are a) the maximum brightness (transmission in the bright state), b) the maximum contrast (ratio between the maximum transmission in the bright state and the maximum transmission in the dark state), c) the image generation rate (or alternatively the addressing rate of a pixel).

It is an object of the present invention to provide a ferroelectric liquid-crystal display of improved brightness, improved contrast and improved switching time.

In order to describe this objective, the brightness (or bright transmission), the contrast and switching time are described below in greater detail.

a) The maximum transmission in the bright state T(bright) is described, as is known, for FLC displays to a good approximation by the equation (1):

$$T(bright) = \sin^2(\pi \Delta n d/\lambda) \cdot \sin^2(4\theta_{eff}) \quad (1)$$

where $\Delta n$ = difference between the refractive indices (monoaxial approximation),
d = thickness of the FLC layer,
$\lambda$ = wavelength in vacuum
$\theta_{eff}$ = effective tilt angle.

In the ideal case, T(bright) is 1 (or 100%).

While the first of the two expressions in equation (1) can be optimized relatively easily by matching $\Delta n$ and d to the wavelength of visible light, the optimization of $\sin^2(4\theta_{eff})$ through the materials presents difficulties since $\theta_{eff}$ is generally very much smaller than 22.5° (the optimum value).

In the so-called "chevron" structure (see, for example, T. Rieker et al., 1986, 11th Int. Liq. Cryst. Conf. (Berkeley, 1986)), the materials currently available only, as is known, have angles up to about $\theta_{eff} = 8°$, which results in a maximum transmission T(bright) of 0.28 and thus corresponds to a loss of 72% in the light output of the FLC display illumination.

An exception with respect to the tilt angle are FLC displays having an alignment layer comprising silicon monoxide (SiO) vapor-deposited at an angle, but this must be applied using a very expensive process.

As shown below, the FLC displays according to the invention have a much greater effective tilt angle in the "chevron" structure and thus facilitate very much higher transmissions in the bright state and do not require an economically unfavorable vapor-deposition process in their production.

Another way of obtaining high transmission values in the bright state is to use the so-called "bookshelf" or "quasi-bookshelf" geometry, in which the smectic layers are perpendicular or virtually perpendicular to the glass plates (see, for example, H. R. Dübal et al., Proc. 6th Intl. Symp. on Electrets, Oxford, England, 1988; Y. Sato et al., Jap. J. Appl. Phys., Vol. 28, 483 (1989)).

b) The contrast is the ratio between the transmissions in the bright and dark switching states. Maximum contrast values of from 5 to 10 are currently given for FLC displays. The reason for these values, which are too small for many applications (for example TV), is firstly inadequate transmission in the bright state and excessive residual transmission in the dark state. The residual transmission is easily detectable between crossed polarizers from a bluish liquid-crystal texture. It is found for all FLC materials known hitherto if organic alignment layers, such as, for example, those made of rubbed polyimide and polyamide, are used.

Again, SiO vapor-deposited at an angle in an expensive vacuum process is an exception since states with significantly lower transmission in the dark state and much higher contrast values are obtained here, even values of 100 having been claimed.

As shown below, the FLC displays according to the invention, even based on conventional alignment layers which are inexpensive to produce, for example made of polyimide, polyamide or polyvinyl alcohol, have high contrast values, of a magnitude sufficient even for TV applications.

c) The image generation rate or the picture frequency is given by the number of lines of an FLC display and the time duration of the electrical switching pulse. The shorter the switching pulse width, the faster the image generation. On the other hand, the switching time depends, as far as the materials are concerned, on the spontaneous polarization (P) and the viscosity ($\gamma$) of the FLC material.

Since the values for the rotational viscosity ($\gamma$) cannot be reduced sufficiently, an increase in (P) is a suitable way of shortening switching time. However, this is currently prevented by reverse switching effects— probably caused by ionic impurities—which are also known in the relevant literature by the terms "surface memory effect", "reverse switching" "ghost image" and the like (cf., for example, J. Dijon et al., SID conference, San Diego, 1988, pages 2-249).

The result of the ionic impurities is that an image must be written-in more than once before the previous image disappears completely ("ghost image"). This effect, which considerably restricts the economic potential of the FLC displays, is the greater the higher the spontaneous polarization of the FLC material.

DE-A-3 939 697 presents FLC mixtures which, in order to prevent or reduce the "ghost-image effect" in displays, contain, as one component, a complex ligand for ions.

Surprisingly, it has now been found that, inter alia, compounds which render the alignment layer amphiphilic give greatly improved contrast and greater brightness in FLC switching and display elements.

The present invention thus relates to a liquid-crystal display containing transparent outer plates, electrodes, at least one polarizer, a ferroelectric liquid-crystalline medium, at least one alignment layer and possibly an insulation layer, in which the alignment layer contains, within the layer or at the surface, a component which renders the alignment layer amphiphilic, and thus modifies, preferably reduces, the hydrophilic interactions between the alignment layer and liquid-crystalline medium.

A substance is defined as being amphiphilic if it has both hydrophilic and lipophilic properties. In the extreme case, amphiphilic compounds have a surfactant character.

However, compounds of the coronand and cryptand type also have hydrophilic (endosphere of the oxygen donor centers) and lipophilic (exosphere of the C-H units) properties.

It is also possible to render alignment layers amphiphilic, and it is entirely possible for hydrophilic properties and lipophilic properties to be present at discrete locations.

Thus, for example, a polar PVA can be provided with a partially hydrophilic and partially lipophilic behavior, and thus rendered amphiphilic, by treatment with lipophilic compounds or by linking (by covalent bonds) to lipophilic structures.

An analogous procedure is possible for lipophilic alignment layers and hydrophilic additives. An originally hydrophilic or lipophilic alignment layer can also be rendered amphiphilic by treatment with an amphiphilic compound or by chemically bonding an amphiphilic compound to the alignment layer.

An alignment layer which has been rendered amphiphilic gives significantly increased contrast in the FLC display and greater image brightness.

In the FLC displays according to the invention, a suitable substance (described in greater detail below) or a mixture of substances is applied to the alignment layer and, as a thin intermediate layer between the alignment layer and the ferroelectric liquid-crystal layer, affects the alignment and/or switching behavior in such a manner that the desired high contrast and brightness values can be achieved but without the need to choose the expensive SiO oblique vapor-deposition route.

The substances which are effective in this way can either be chemically bonded to the alignment layer or merely applied as a strongly or weakly physisorbed layer.

The component in the display which causes the amphiphilicity of the alignment layer can thus be applied as an additional layer between the alignment layer and the FLC layer, but may alternatively be added to the material of the alignment layer as a simple mixture component. A further possibility is to couple the substance to the material of the alignment layer by a chemical reaction.

The effective intermediate layer can be applied, for example, from a solution of suitable compounds in acetone, toluene, cyclohexanone, isopropanol, N-methylpyrrolidone or the like by printing, immersion, spraying, spin-coating or the like. Vacuum deposition processes, such as simple vapor deposition or reactive vapor-deposition processes (such as, for example, "chemical vapor deposition (CVD)") are also suitable.

The effective intermediate layer can be applied at several stages in the FLC display production process, for example immediately after curing or drying of the alignment layer, before the rubbing step or Just before the cell is bonded together. The substances or substance mixtures may likewise be applied to the wet fill of the alignment layer and cured, i.e. heated, at the same time as the alignment layer.

It is also advantageous to mix the effective substances or substance mixtures into the polymer solution or polymer precursor solution made up for producing the alignment layer, and then apply them together with this solution in one step.

The effective compounds may in principle be either monomeric, oligomeric or polymeric compounds. In general, they have a moderate to highly lipophilic character with low polarity or have separate localized areas of high and low polarity/hydrophilicity. Cyclic compounds may also have an exosphere which tends to have a lipophilic nature and an endosphere with a fairly hydrophilic nature.

The type of compound which is suitable for rendering the alignment layer in the FLC display amphiphilic depends, inter alia, on the FLC medium employed and on the alignment layer.

The alignment layers may be any materials which can conventionally be used, such as, for example, polyether ketones, polyamides, polyimides and polyvinyl alcohols, in particular those containing free functional groups, such as, for example, OH, ester, amino or carboxyl groups, and also siloxanes, oligomers or polymers containing SiO or Si units and electroconductive polymers.

Particularly suitable polyether ketones are the substances proposed in German Patent Application P 40 02 082.

They comprise at least one structural unit of the formula I

=O=A=O=B= (I)

where A is selected from the radicals

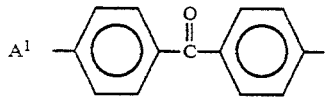

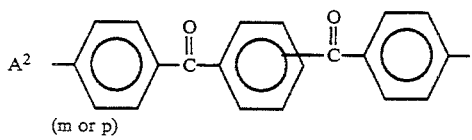
(m or p)

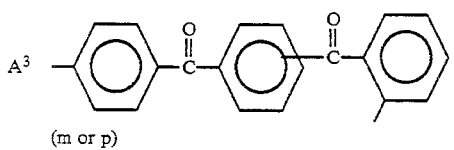
(m or p)

and B is selected from the radicals

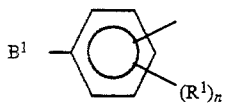

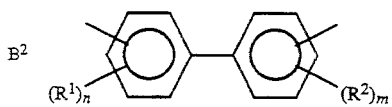

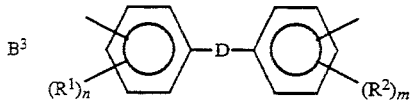

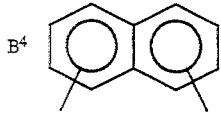

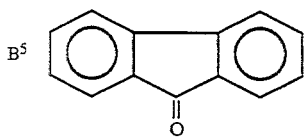

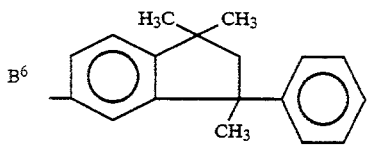

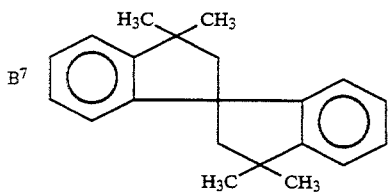

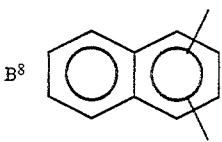

where $R^1$ and $R^2$ are identical or different and are hydrogen, halogen, preferably bromine, $(C_1-C_8)$-alkyl or -alkoxy, preferably $(C_1-C_4)$-alkyl or -alkoxy, or are aryl or aryloxy having 6 to 12 carbon atoms in the aryl radical, m and n are identical or different and are zero or, as an integer, 1, 2, 3 or 4, preferably zero, 1 or 2, in particular zero or 2. If $R^1$ and $R^2$ in the radicals $B^2$ and $B^3$ are halogen, m and n are preferably 2. D is selected from the divalent radicals $D^1$ —O—,

$D^3$ —CH$_2$—,
$D^4$ —C(CH$_3$)$_2$—,
$D^5$ —C(CF$_3$)$_2$—,

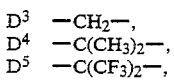

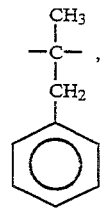

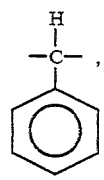

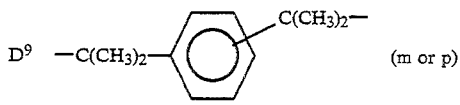
(m or p)

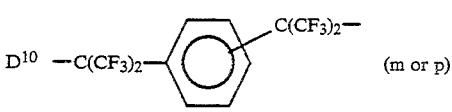
(m or p)

where the molar ratio between the units A and B is from 0.9 to 1.1:1.0, preferably 1:1.

The polymers mentioned may be homopolycondensates, i.e. contain only one unit of type A and one unit of type B per recurring unit, or copolycondensates which contain two or more different units of type A and/or two or more different units of type B.

Particularly suitable polyamides are the substances indicated in German Patent Applications P 38 33 180 (filming date: Sep. 30, 1988 and publication date: Apr. 5, 1990) P 39 38 209 (filming date: Nov. 17, 1989 and publication date: May 23, 1991). The compounds comprise structural units of the formula II

 (II)

where the units E and G have the following meanings:

E = 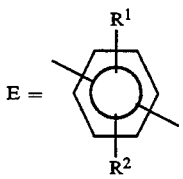

where R¹ and R² are identical or different and are H, (C₁-C₆)-alkyl, preferably (C₄-C₆)-alkyl, or (C₁-C₆)-alkoxy, preferably (C₄-C₆)-alkoxy, with the proviso that at least one of the radicals R¹ and R² contains a tertiary carbon atom, preferably the —C(CH₃)₃ group, or = 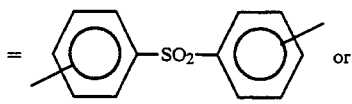 or

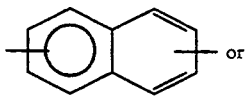 or

= 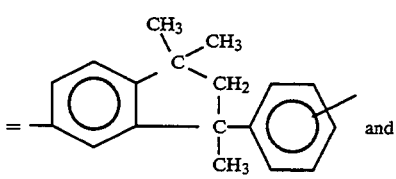 and

G = 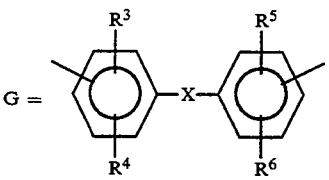

where R³, R⁴, R⁵ and R⁶ are identical or different and are —CH₃, —CF₃, —OCH₃, —F, —Cl, —Br or —H, and X is —O—, —C(CH₃)₂—, —C(CF₃)₂—, —SO₂—, —CO—, —CH₂— or the radical

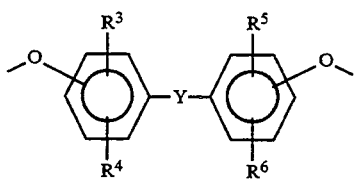

where R³ to R⁶ are as defined above and Y is —C(CH₃)₂—, —C(CF₃)₂—, —SO₂—, —CO—, —CH₂— or —O—, or = 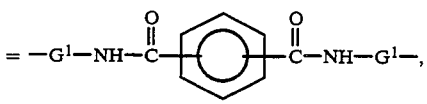, where G¹ is as defined above for G.

The polymers according to the invention containing structural units of the formula II may either be homo-condensates which contain only identical structural units of the formula II or cocondensates comprising different structural units of the formula II. Preference is given to copolyamides which contain different structural units of the formula II, preferably in a random distribution.

It is furthermore possible to employ polymers comprising cocondensates containing at least 10 mol- %, based on the polymer, of structural units of the formula II, which may be identical or different, and structural units of the formula III

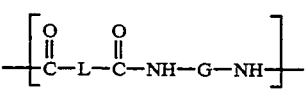 III in which L is

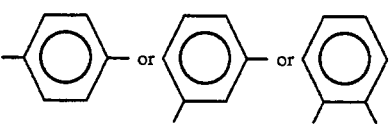

and G is as defined for the formula II.

The molar ratio between the structural units of the formulae II and III in the copolyamides, preferably with a random distribution of the structural units, is preferably in the range from 1:9 to 9.5:0.5, in particular from 1:9 to 1:8.

As a measure of the molecular weight of the polymer, the limiting viscosity [η], which can be determined by known measurement methods on solutions of the polymers, can be emoployed. The limiting viscosity [η] of the polyamides or copolyamides according to the invention can be varied within a broad range. It is preferably from 0.2 to 5 dl/g, in particular from 0.4 to 4.2 dl/g, measured in N-methylpyrrolidone (NMP) solution at 25° C.

It is furthermore possible for the alignment layer to comprise aromatic polyamides containing structural units of the formula IV,

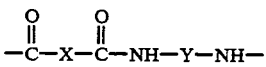 (IV)

where the symbols have the following meanings:

—X— = 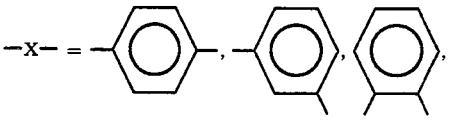

-continued

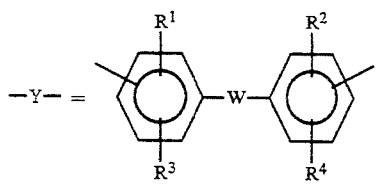

where $R^1$ and $R^2$ are identical or different and are perfluorinated alkyl having 1 to 4 carbon atoms, $R^3$ and $R^4$ are identical or different and are H or $CF_3$, and —W— is —O—, —C(CH$_3$)$_2$—, —C(CF$_3$)$_2$—, —SO$_2$—, —CO—, —CH$_2$—, a single bond or the radical

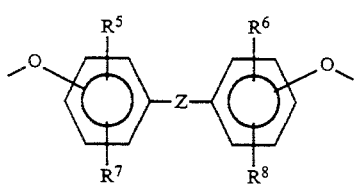

where $R^5$, $R^6$, $R^7$ and $R^8$ are identical or different and are $CH_3$, $CF_3$, $OCH_3$, F, Cl, Br or H, and —Z— is —C(CH$_3$)$_2$—, —C(CF$_3$)$_2$—, —SO$_2$—, —CO—, —CH$_2$— or —O—.

The group —X— may additionally be one of a wide range of other divalent groups since the dicarboxylic acid component may also be, for example, 1,4-cyclohexanedicarboxylic acid or a pyridinedicarboxylic acid.

Particularly suitable polyimides are fluorinated polyimides and those containing free functional groups, such as, for example, OH, ester, amino or carboxyl groups.

Preferred electroconductive polymers are compounds of EP-A 412 408 containing recurring structural units of the formula V.

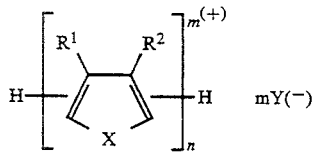
V where $R^1$ and $R^2$, independently of one another, are H or straight-chain or branched alkyl or alkoxy having 1-16 carbon atoms, or halogen, X is S or NH Y$^-$ is BF$_4^-$, PF$_6^-$, PO$_4^{3-}$, AsF$_6^-$, SbCl$_6^-$, SO$_4^{2-}$, HSO$_4^-$, alkyl-SO$_3^-$, perfluoroalkyl-SO$_3^-$, aryl-SO$_3^-$, F$^-$ or Cl$^-$, n is an integer from 4 to 100, and m is an integer from 1 to 30.

The alignment layer employed preferably contains a polyimide, polyamide or polyvinyl alcohol (PVA) as the base component. In this case, the alignment layer preferably contains from 50 to 99.99% by weight of the polyimide, polyamide or PVA and a total of from 0.01 to 50% by weight of one or more of the effective compounds.

The materials which are generally suitable for alignment layers, such as polyamides, polyimides and PVAs, are described, for example, by Birendra Bahadur in Mol. Cryst. Liq. Cryst. 109, I (1984).

In a preferred embodiment, insulation layers are used to prevent short-circuits, with the layer sequence being (1) glass,
(2) ITO electrode,
(3) insulation layer,
(4) alignment layer with additive mixed in or chemically or physically bonded to the surface.

In order to suppress the above-described "surface memory effect", the electrical capacitance of the insulation and alignment layers should be as high as possible (cf. in this respect C. Escher, H.-R. Dübal, T. Harada, G. Illian, M. Murakami and D. Ohlendorf, 2nd Int. Symp. on FLC, Gothenburg, 1989, published in Ferroelectrics).

For adequate insulation, the thickness of the insulation layer should be at least 50–100 nm. In order to achieve a sufficiently high capacitance at this thickness, insulation layers having high dielectric constants, such as, for example, Ta$_2$O$_5$, TiO$_2$, etc., must be used (see also J 61/170 726A, J 61/078 235A, Y. Inabe, K. Katagiri, H. Inone, J. Kanbe, S. Yoshihara and S. IiJima, Ferroelectrics (1988), 85, pp. 255–264).

Particularly suitable compounds which render the alignment layer amphiphilic are macrocyclic compounds, cryptands, coronands, podands, mercapto compounds, ionophoric compounds and polymers containing rings, it being possible for these rings themselves to contain heteroatoms (O, S, N, etc.). An example of a ring-containing polymer is:

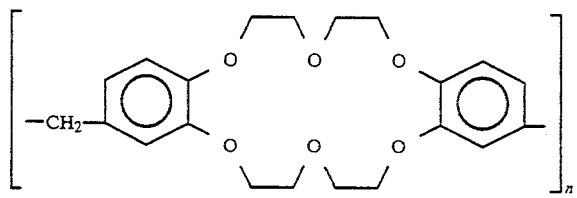

where n is 3 to 1,000.

Macrocyclic compounds to be employed according to the invention are described in the recently filed German patent application "Verwendung yon macrocyclischen Verbindungen als Komponente für ferroelektrische Flüssigkristallmischungen" [Use of macrocyclic compounds as a component of ferroelectic liquid-crystal mixtures] (P 4 011 804.5), which is not a prior publication, and are reproduced here by the formula VI.

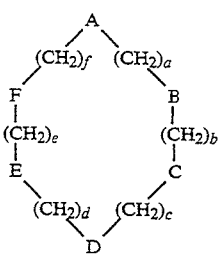
VI where a, b, c, d, e and f, independently of one another, are integers from zero to 4, where a+b+c+d+e+f≧7, and —A—, —B—, —C—, —D—, —E— and —F— are identical or different and are

—CH$_2$—, —CHR'—, —CH=CH—, —CR=CR'—,

-continued

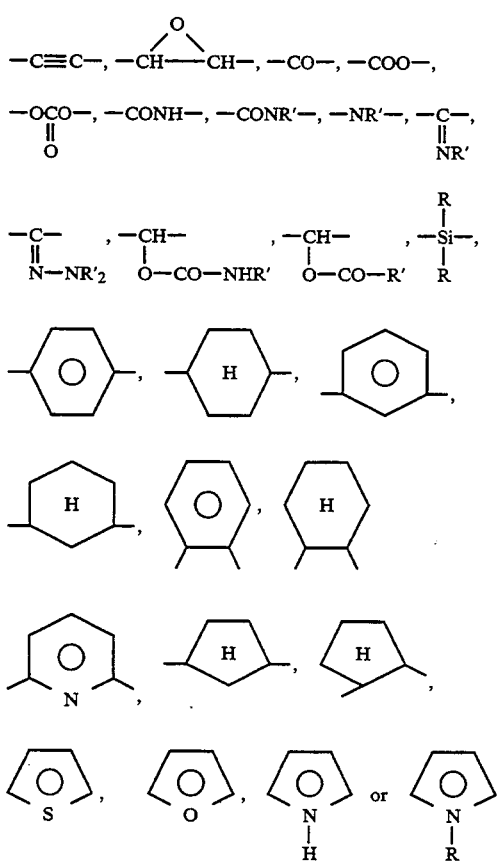

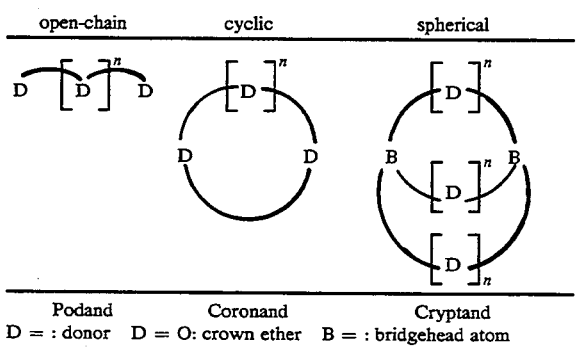

| open-chain | cyclic | spherical |
|---|---|---|
| Podand | Coronand | Cryptand |

D = : donor    D = O: crown ether    B = : bridgehead atom where

R are identical alkyl radicals having 1 to 12 carbon atoms and

R' are identical alkyl radicals having 1 to 12 carbon atoms, it being possible for one —CH$_2$— group to be replaced by —O—, —COO— or —OCO—, or are phenyl, Cl, F or CN.

Cryptands and coronands as mentioned in the recently filed German patent application "Kryptanden bzw. Coronanden enthaltende ferroelektrische Flüssigkristallmischung" [Ferroelectric liquid-crystal mixture containing cryptands and/or coronands] (P 4 011 803.7), are likewise particularly suitable as compounds which render the alignment layer amphiphilic.

For a classification of said complex ligands, reference is made to E. Weber and F. Vögtle, Inorganica Chimica Acta, Vol. 45, (1989) L65-L67. The ligand topologies listed therein are reproduced below:

-continued

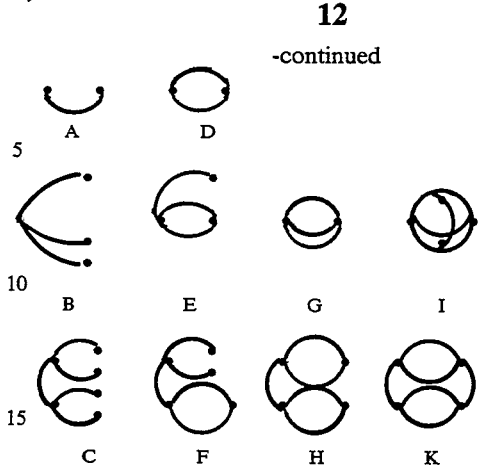

A-C: acyclic (podands); D-F: monocyclic (coronands);
G-H: bicyclic (coronends, cryptends); I-K: tricyclic (cryptands).

The cryptands or coronands to be employed can be represented by the formula VII or VIII;

$$\begin{array}{c} CH_2(-CH_2-Z-CH_2)_m-CH_2 \\ | \qquad\qquad\qquad\qquad\qquad | \\ X^1 \qquad\qquad\qquad\qquad\qquad X^2 \\ | \qquad\qquad\qquad\qquad\qquad | \\ CH_2(-CH_2-Z-CH_2)_n-CH_2 \end{array}$$ VII where
—Z— is —O— or —S—, m and n are integers greater than zero and m+n=2 to 6, —X$^1$— and —X$^2$— are identical or different and are

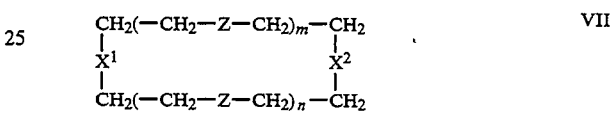

or

—X$^1$— and —X$^2$— together are N—CH$_2$(—CH$_2$—Z—CH$_2$)$_1$—CH$_2$—N or N—CO(—CH$_2$—Z—CH$_2$—)$_1$—CO—N where R is alkyl or alkanoyl having 1 to 15 carbon atoms, phenyl, benzyl or benzoyl, and l is 1 or 2;

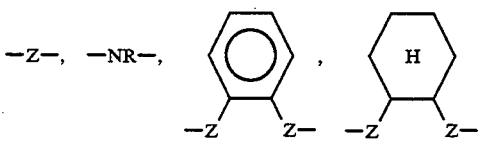

where —R$^1$, —R$^2$, —R$^3$ and —R$^4$, independently of one another, are

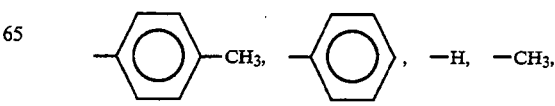

-continued
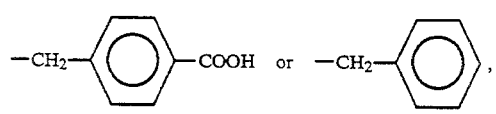
and p, q, r and s, independently of one another, are integers from 2 to 4, where p+q+r+s is 8 to 16.
Preferred coronands are:
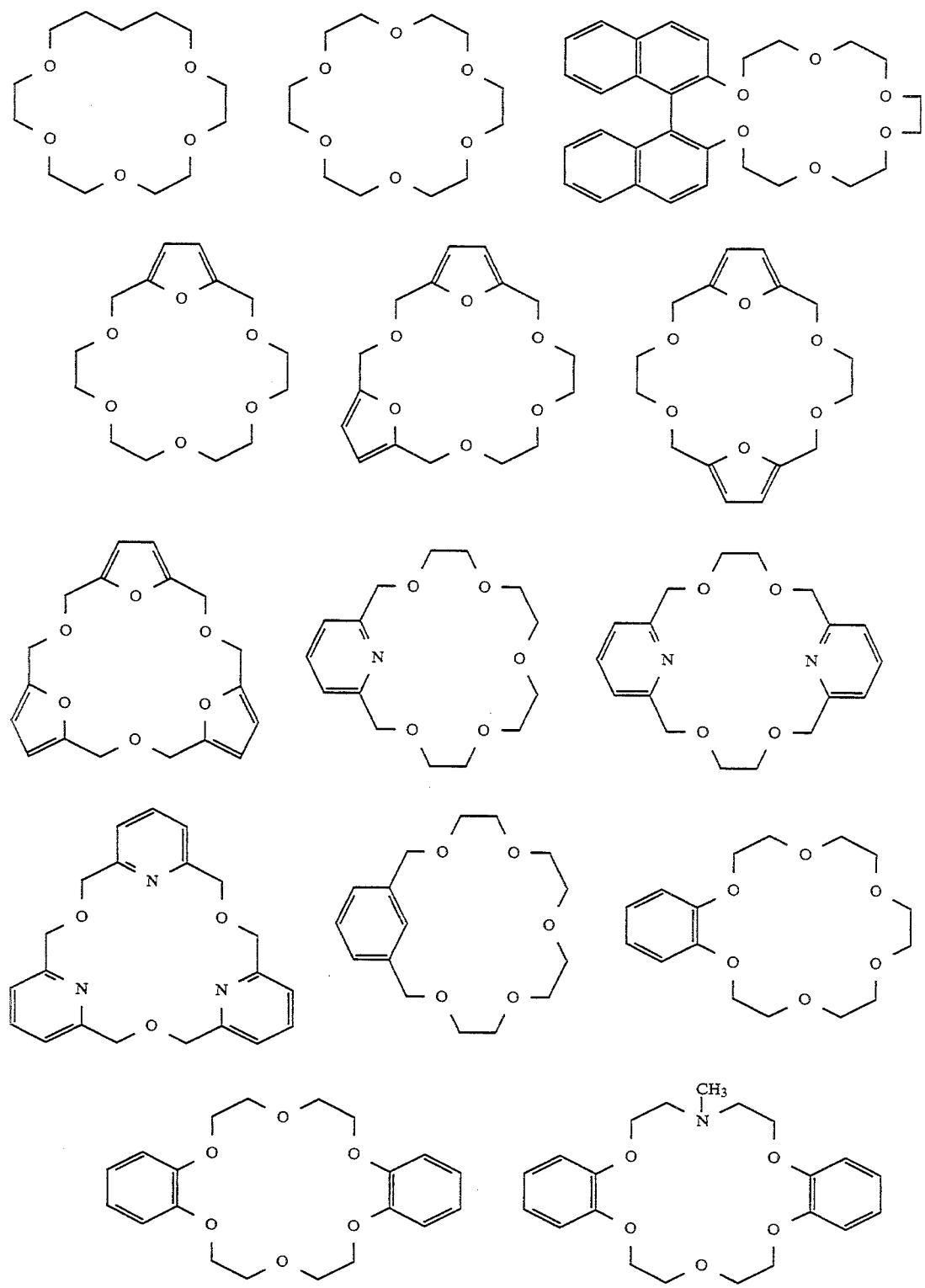

-continued
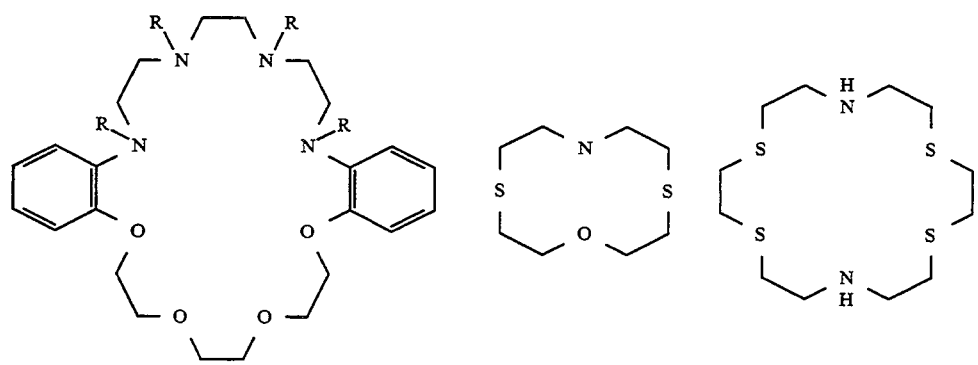
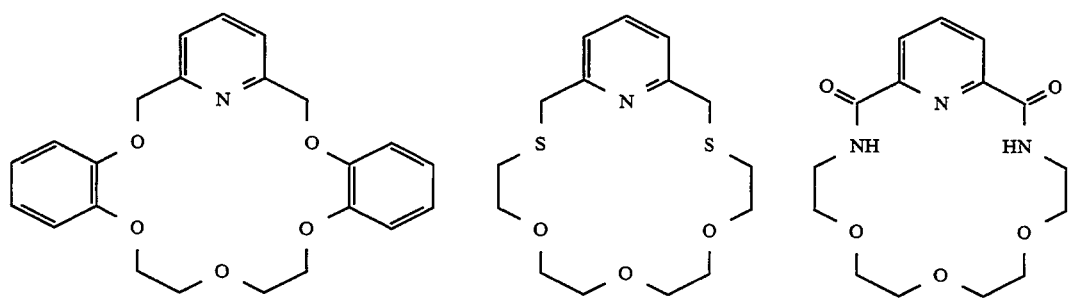
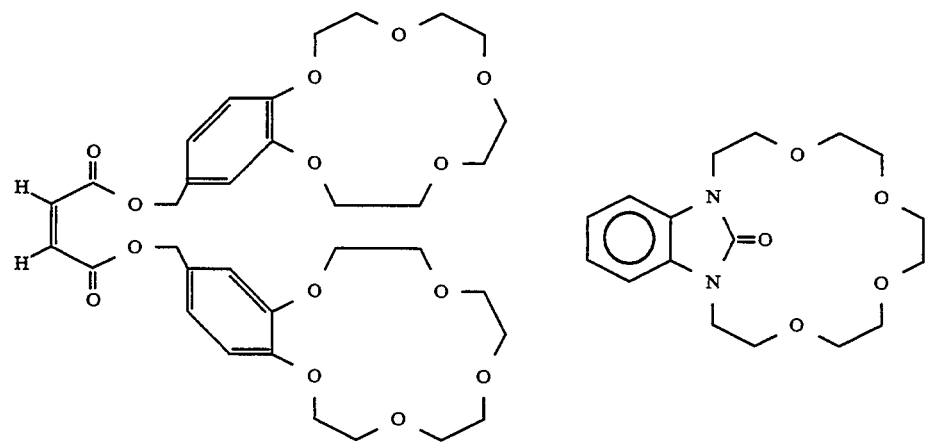
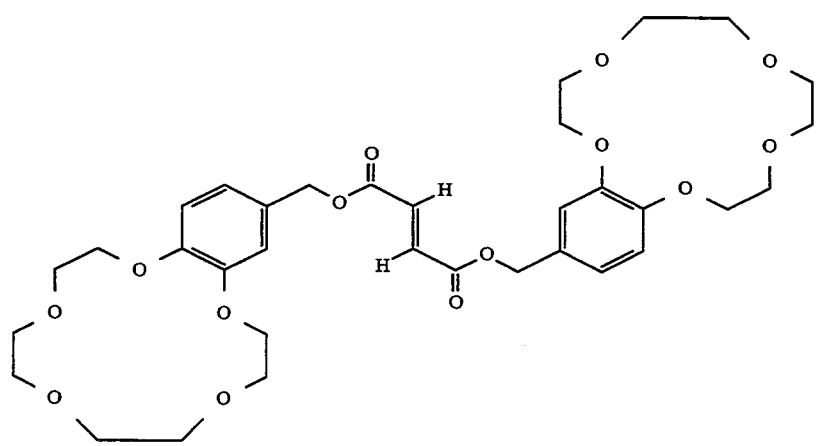

-continued
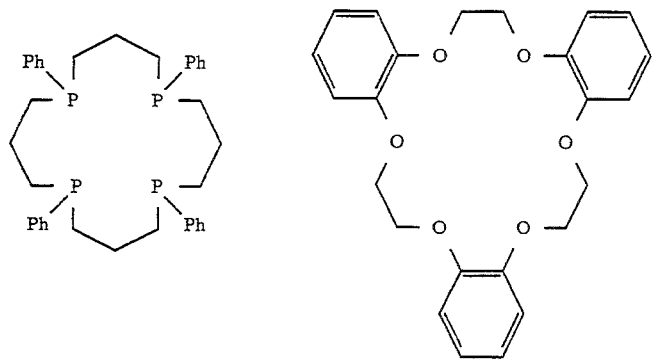
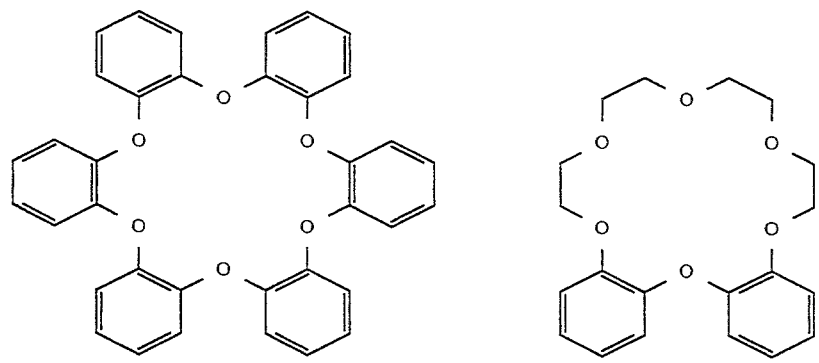
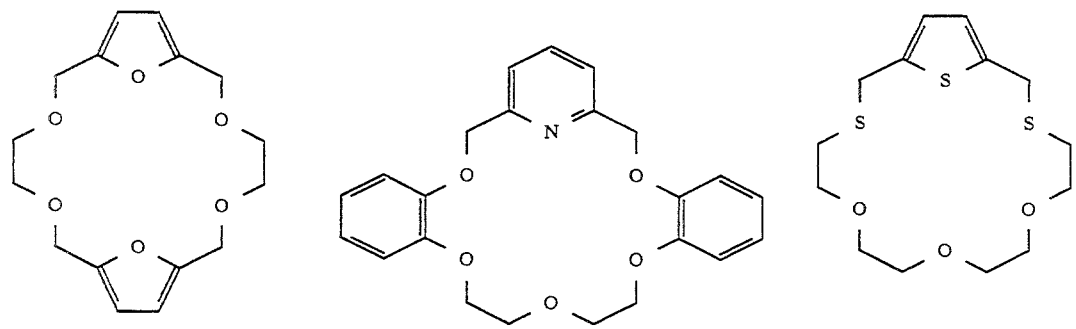
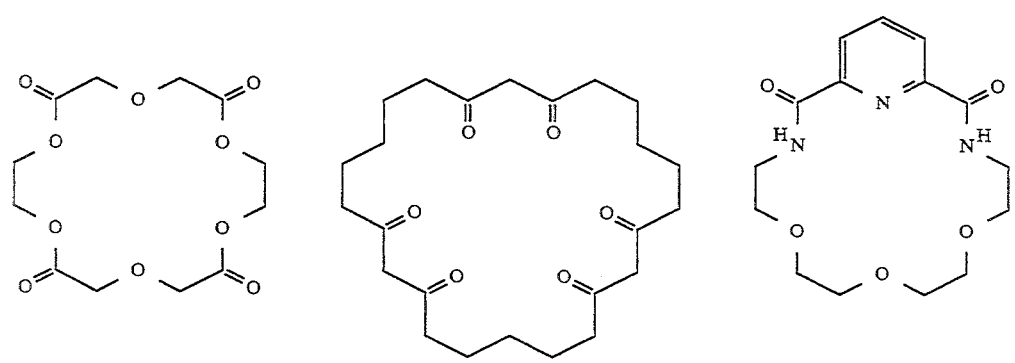

-continued
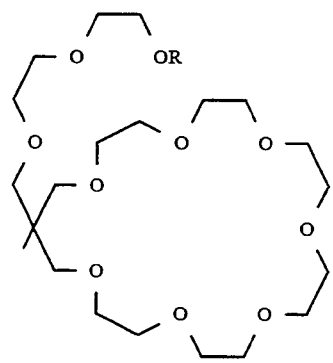 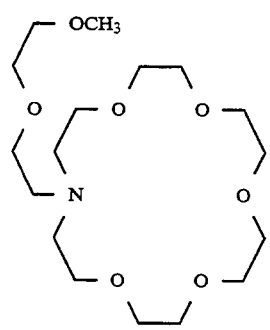 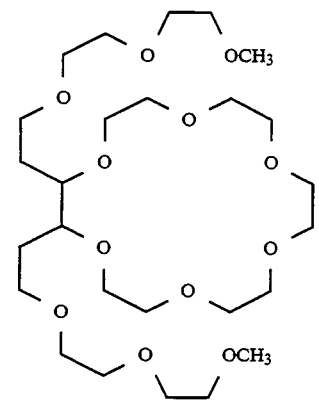
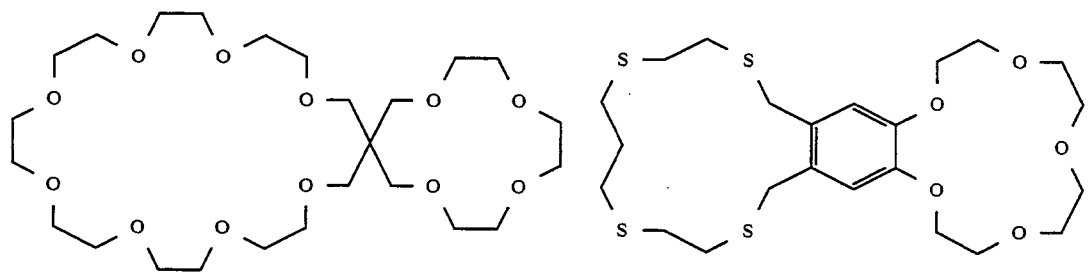
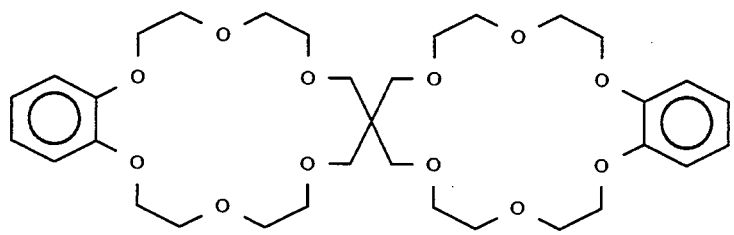
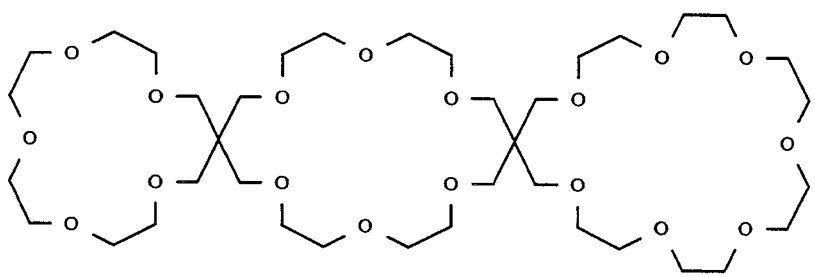
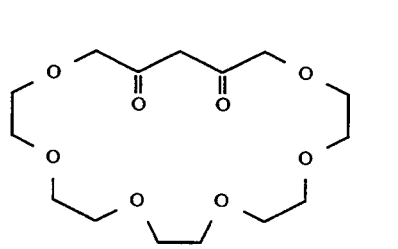 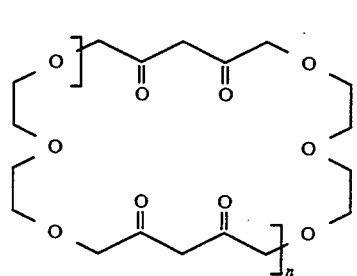 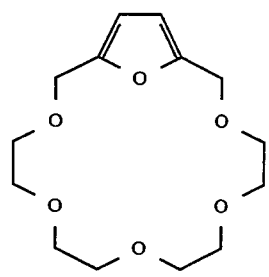
n = 1
n = 2

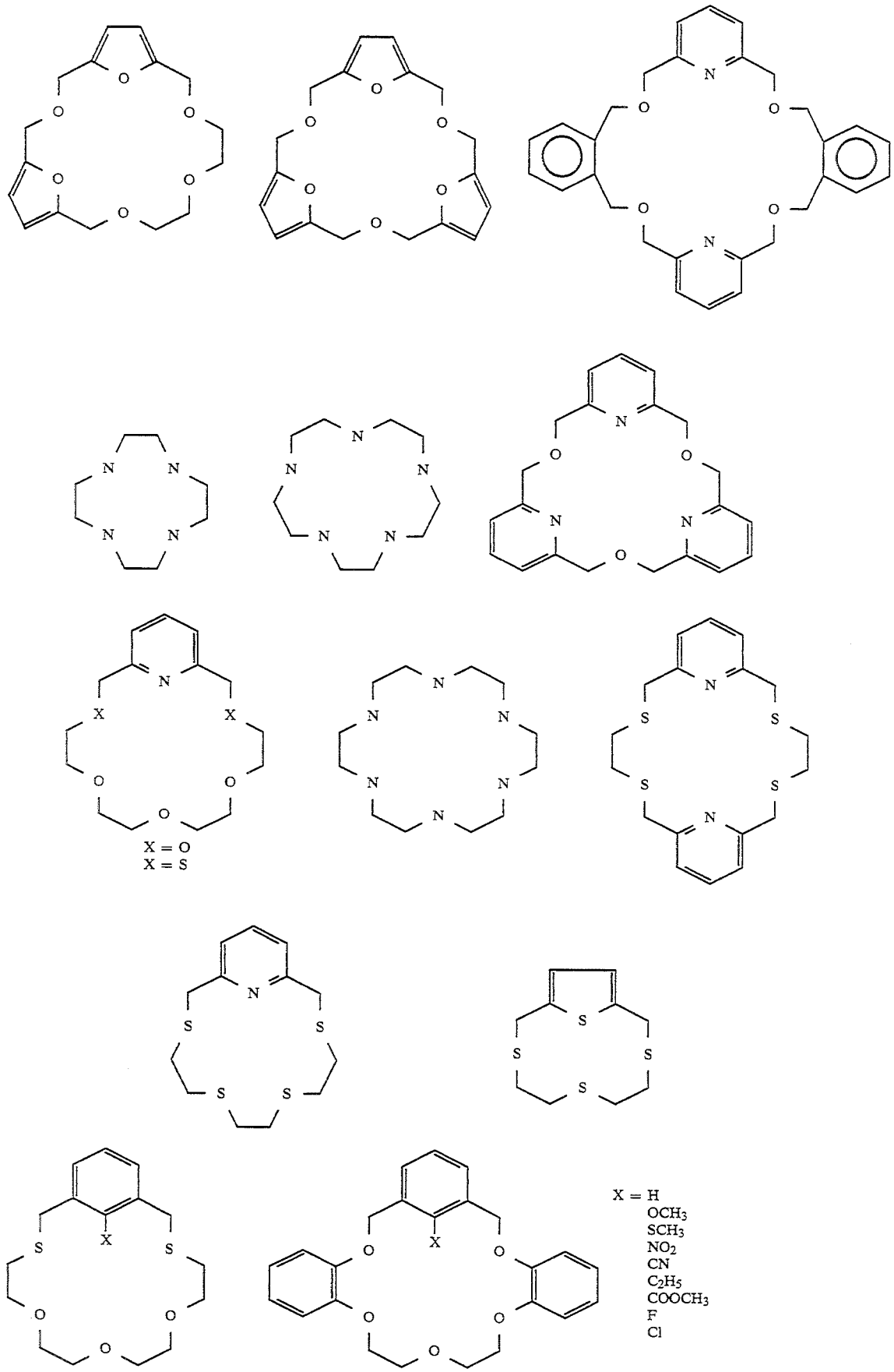

-continued
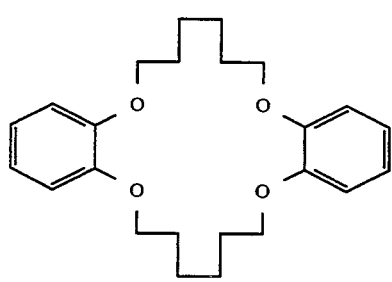
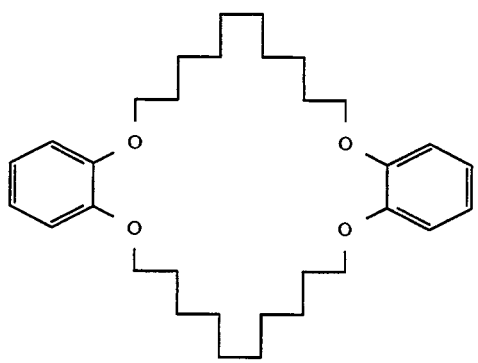
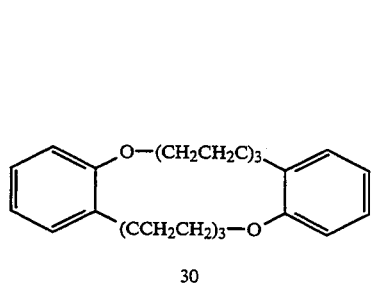
30
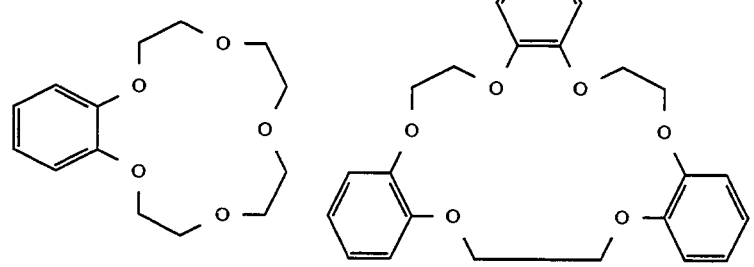
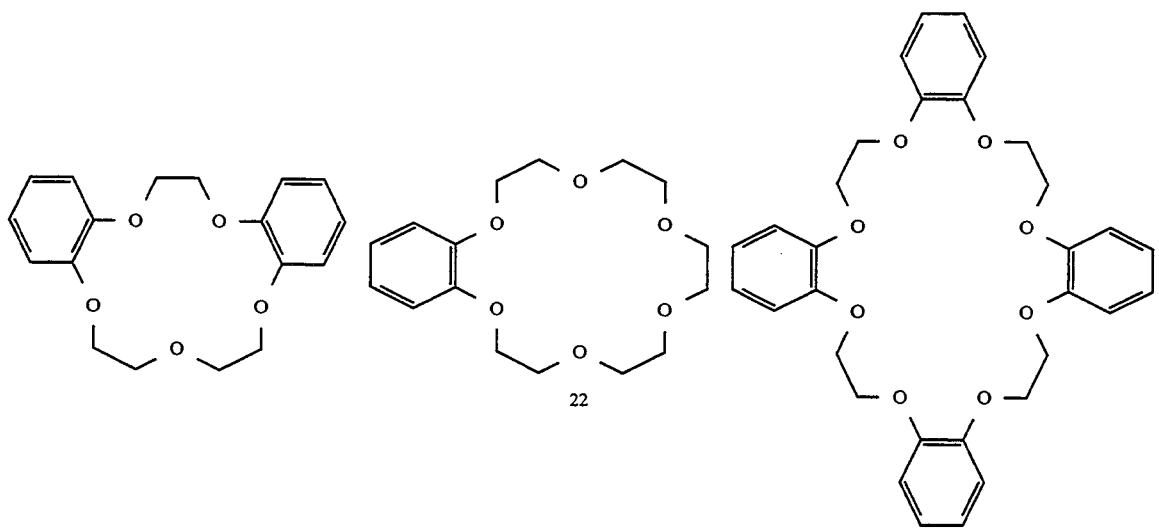
22
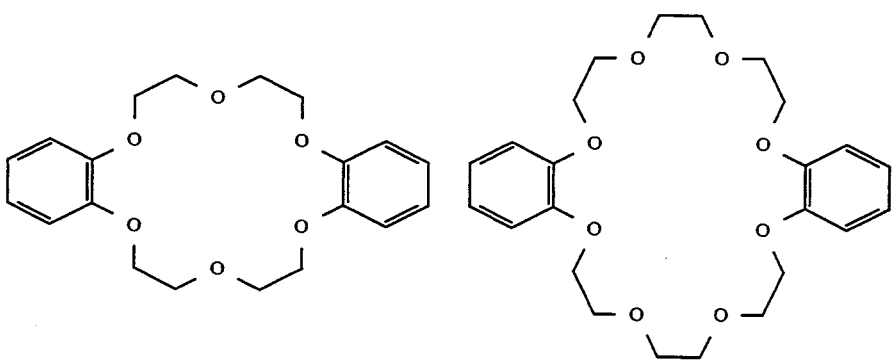

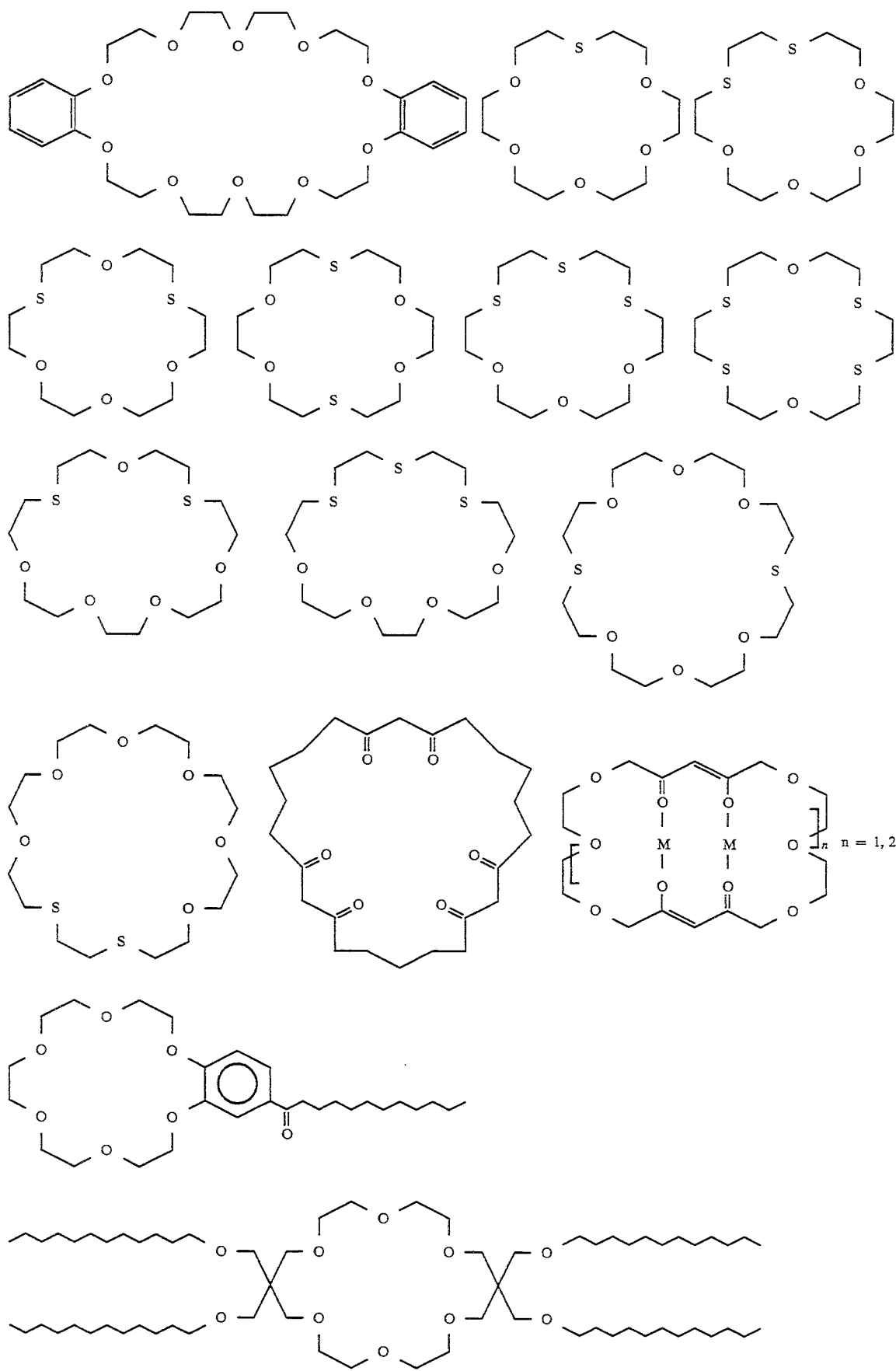

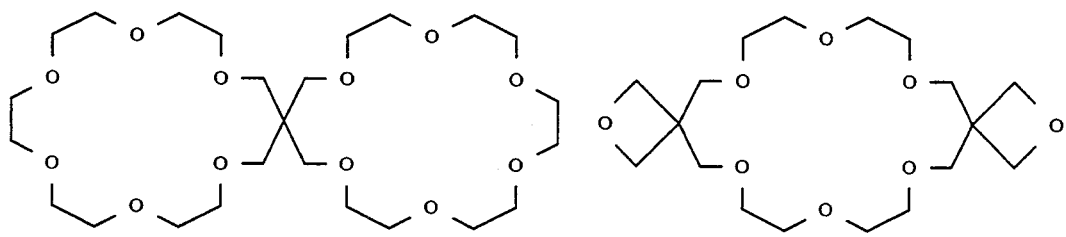
Preferred cryptands are:
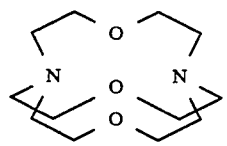 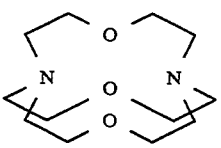
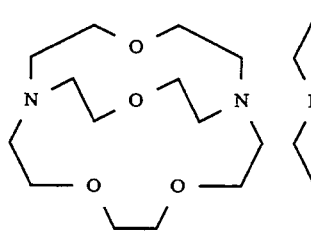 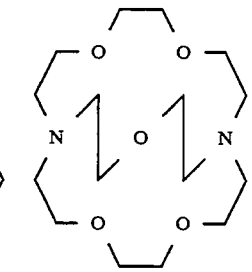
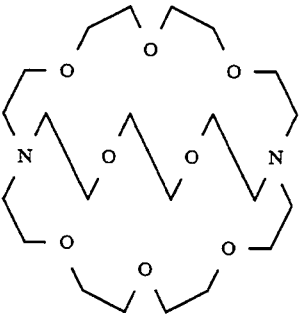
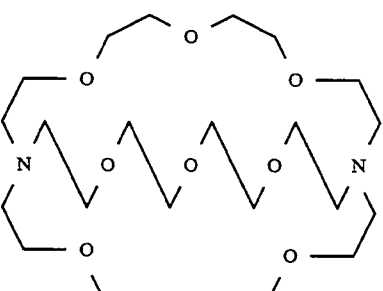
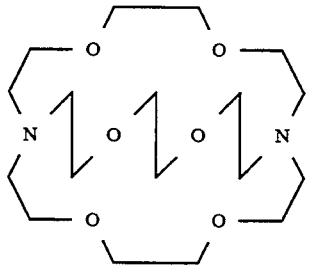
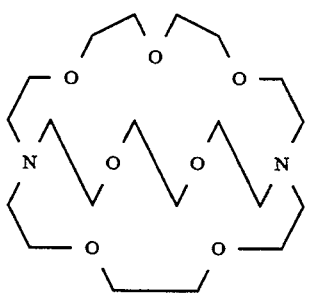
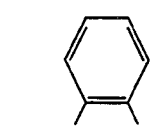
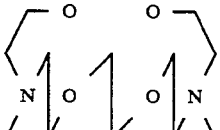
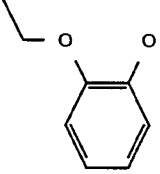

-continued
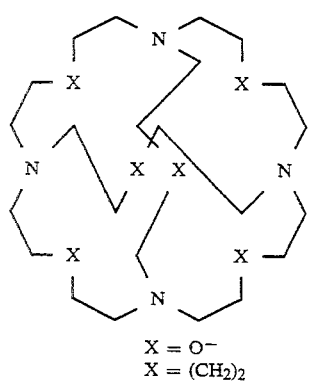
X = O⁻
X = (CH₂)₂
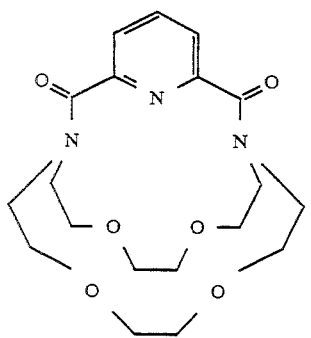
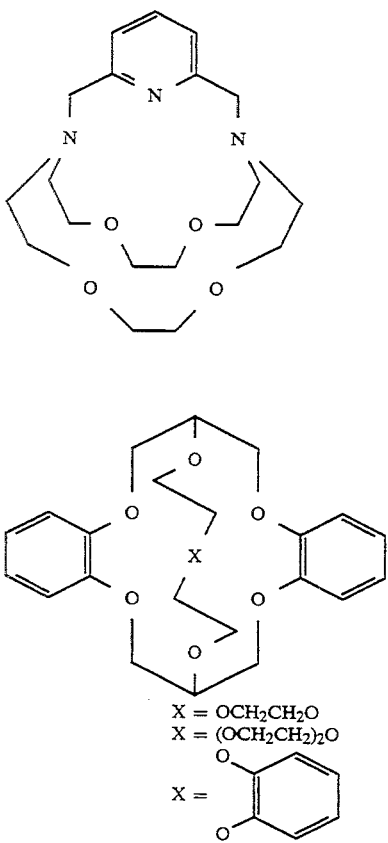
X = OCH₂CH₂O
X = (OCH₂CH₂)₂O
X =
-continued
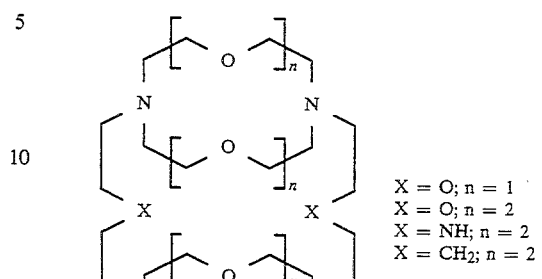
X = O; n = 1
X = O; n = 2
X = NH; n = 2
X = CH₂; n = 2
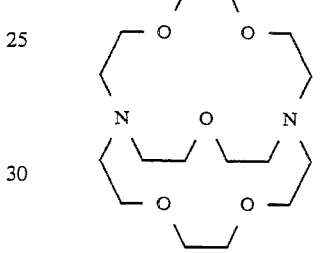

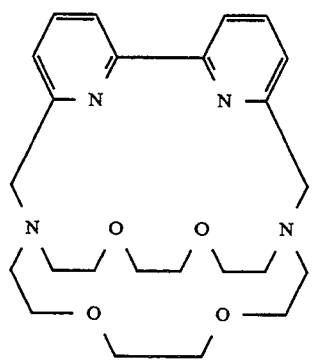
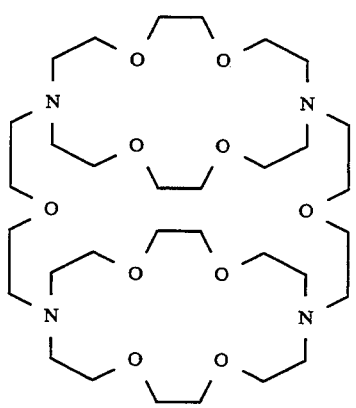
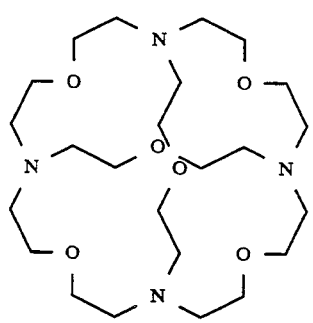
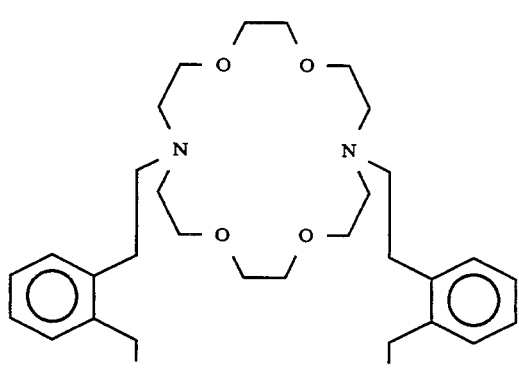
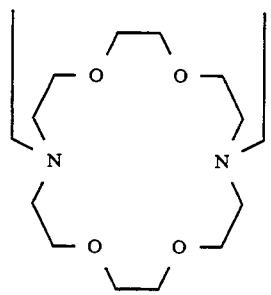
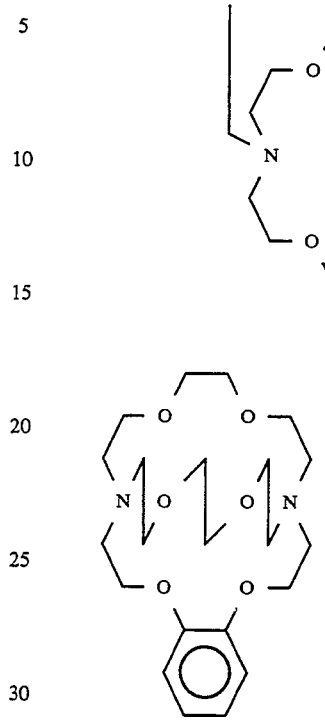
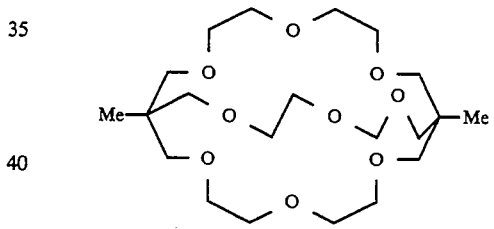
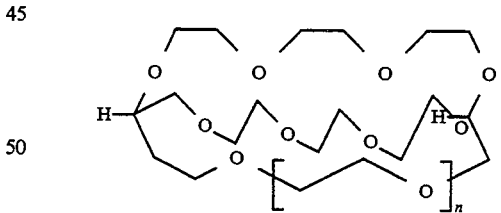
n = 2
m = 3
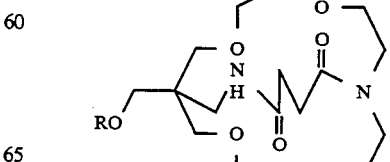

33
-continued
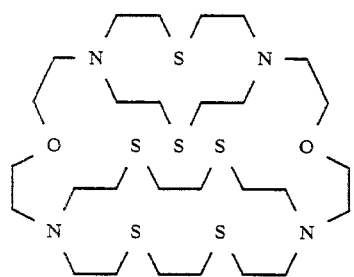
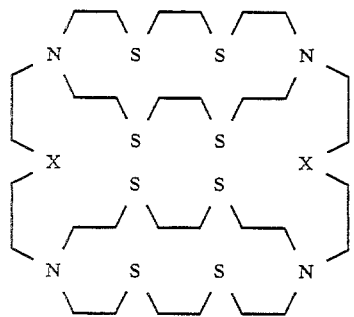
34
-continued
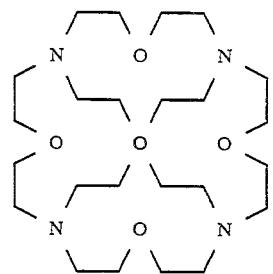
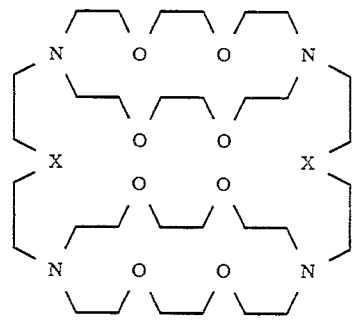
X = O
X = CH₂
X = -Phenylene
X = NH
Characteristic representatives of podands are:
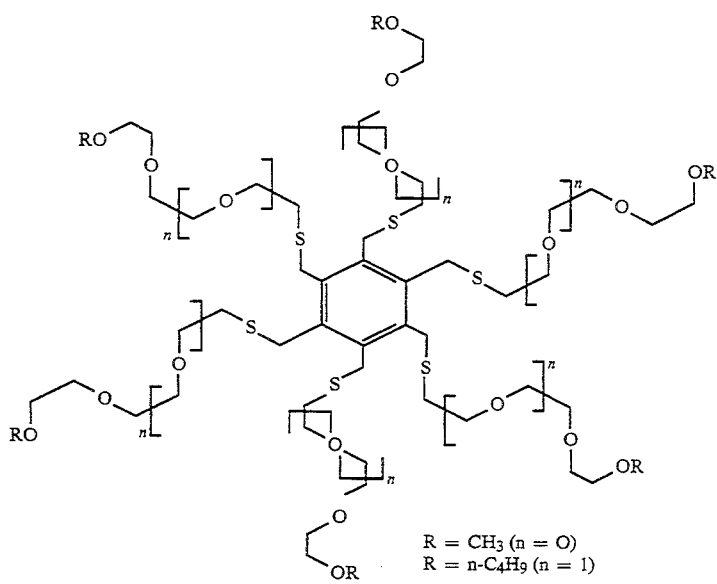
R = CH₃ (n = 0)
R = n-C₄H₉ (n = 1)
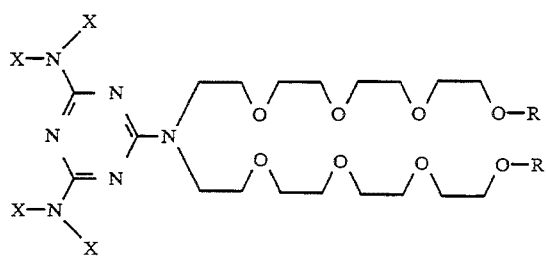

-continued
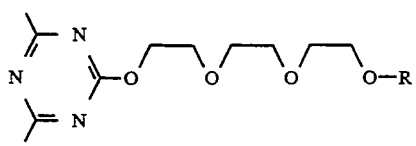
: R = n-C$_4$H$_9$
: R = n-C$_8$H$_{17}$
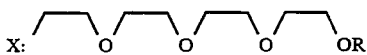
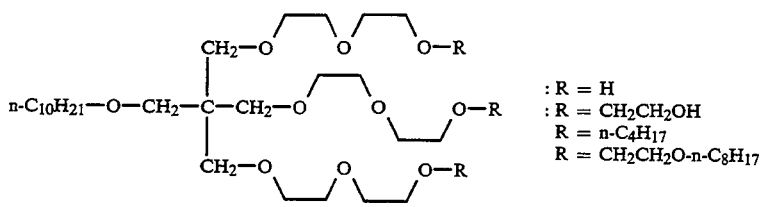
: R = H
: R = CH$_2$CH$_2$OH
R = n-C$_4$H$_{17}$
R = CH$_2$CH$_2$O-n-C$_8$H$_{17}$
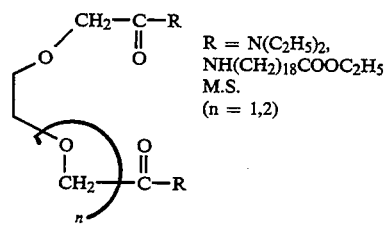
R = N(C$_2$H$_5$)$_2$,
NH(CH$_2$)$_{18}$COOC$_2$H$_5$
M.S.
(n = 1,2)
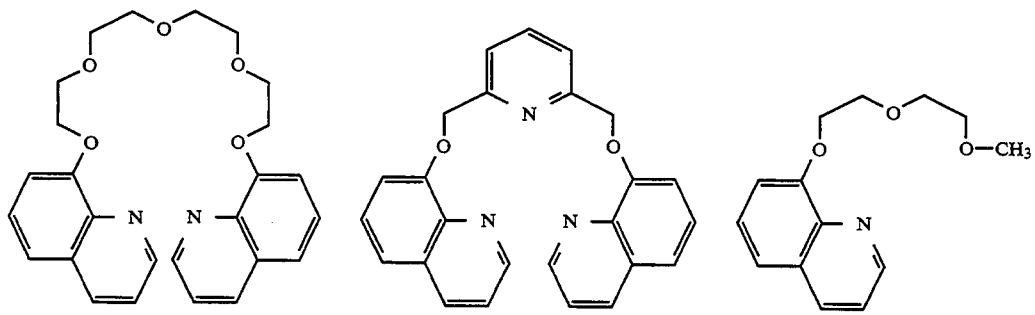
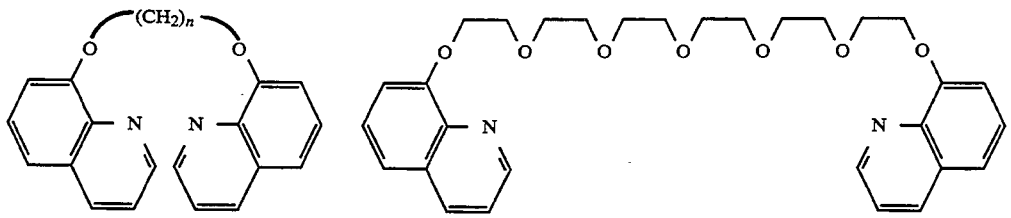
(n = 8, 10)
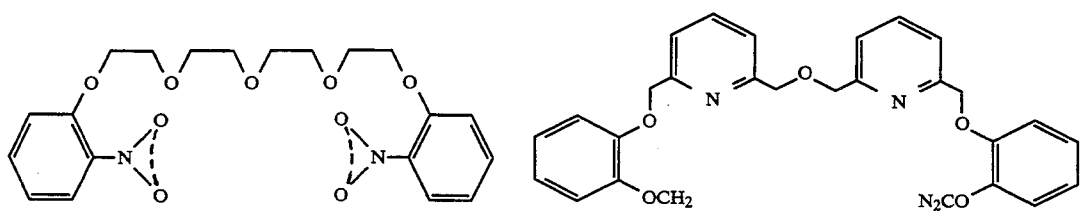

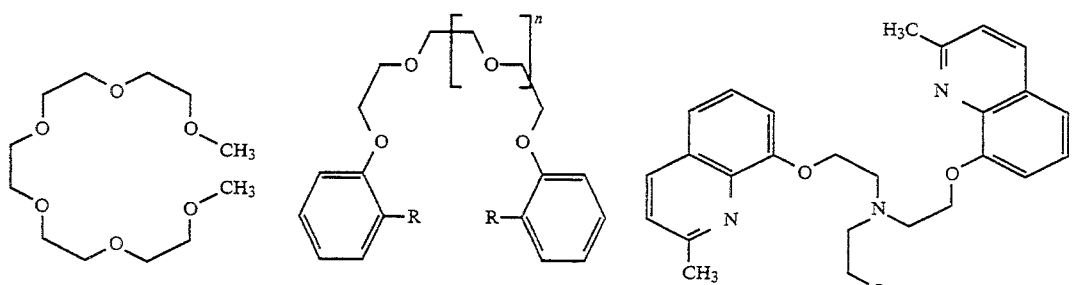
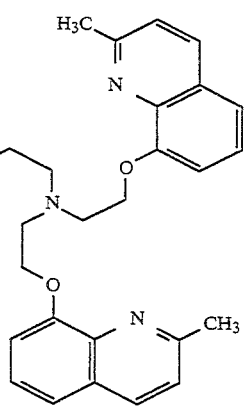
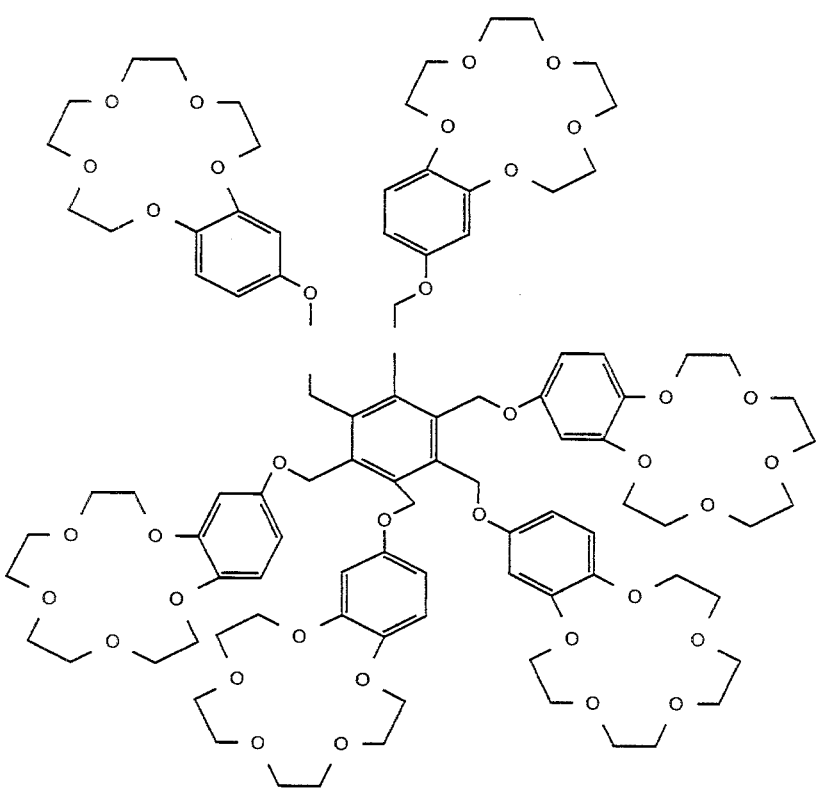
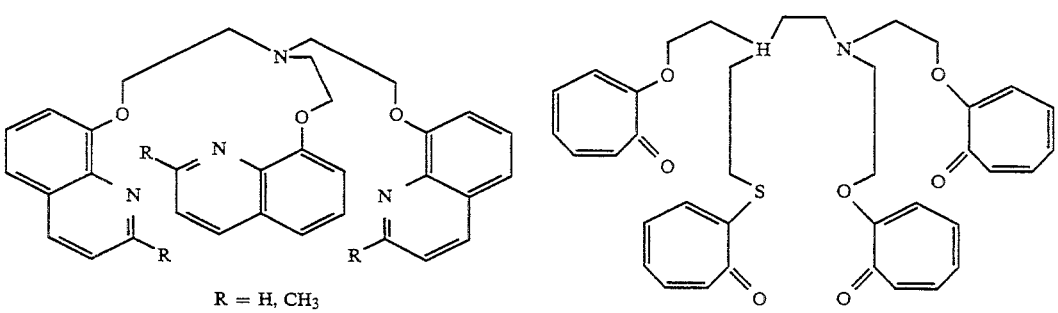
Mercapto compounds to be employed according to the invention are represented by the formula IX below

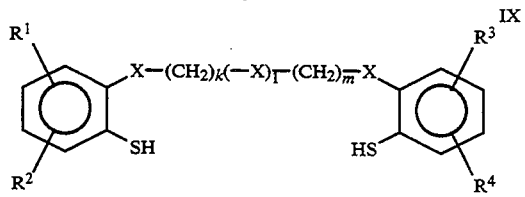

where $R^1$, $R^2$, $R^3$ and $R^4$, independently of one another, are an H atom, alkyl having 1 to 8 carbon atoms or alkoxy having 1 to 8 carbon atoms, —X— is —O—, —S— or —NH—, k and m, independently of one another, are 1, 2 or 3, and l is zero or 1.

Ionophoric compounds as presented in the filed German application "Ionophore enthaltende ferroelektrische Flüssigkristallmischung" [Ferroelectric liquid-crystal mixture containing ionophores] (P 4 011 792.2) are also particularly suitable for increasing the contrast in the display by rendering the alignment layer amphiphilic. The ionophores are more precisely defined by the formula X:

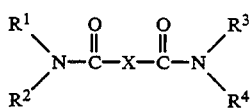

where $R^1$, $R^2$, $R^3$ and $R^4$, independently of one another, are alkyl having 1 to 15 carbon atoms, in which one —CH$_2$— group may be replaced by —COO— or —CO— or a CH$_2$ group which is not bonded directly to the nitrogen atom may be replaced by —O—, or are cyclohexyl, phenyl or benzyl, and is alkylene having 2 to 9 carbon atoms, in which one or two nonadjacent —CH$_2$— groups may be replaced by —O—, in which two adjacent CH$_2$ groups may be replaced by 1,2-phenylene or 1,2-cyclohexylene, in which two adjacent —CH$_2$— groups may be replaced by —CH(CH$_3$)—CH(CH$_3$)— and in which one H atom of a CH$_2$ group may be replaced by $R^5$ or $R^6$, where $R^5$ is alkyl having 1 to 15 carbon atoms and $R^6$ is alkyl having 1 to 15 carbon atoms or CH$_2$—O—CH$_2$—CO—NR$^1$R$^2$.

Very generally, the following types of coupling to or in the alignment layer exist for the compounds mentioned.

I Chemical coupling, i.e. the compound providing the amphiphilicity is preferably bonded to/in the alignment layer by covalent bonds. The compound to be bonded has the formula $$C_y\text{—}G\text{—}R_g$$

where:

$C_y$ is one of the abovementioned amphiphilicity-providing compounds,

G is a straight-chain or branched alkylene unit having 0–18 carbon atoms, in which, in addition, one or more —CH$_2$— groups may be replaced by

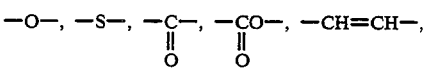

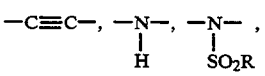

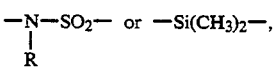

or is cycloalkanediyl, arenediyl or heteroarenediyl, it also being possible for one or more H atoms of the —CH$_2$— groups to be replaced by F and $R_g$ is a reactive group (coupling functionality), for example —OH, —CO$_2$H, —CO$_2$R, —NH$_2$, —NHR', —SH,

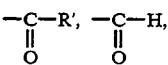

—CN, —N=C=O, —N=C=S, —CH=CH$_2$, —Si(CH$_3$)$_2$Cl, —Si(CH$_3$)$_2$OR', —Si(OR)$_3$, —N$_3$, halide, —N≡C or —SO$_2$CH=CH$_2$.

Preferred compounds are those in which $C_y$ is one of the macrocycles, cryptands or coronands described above.

Very particular preference is given to compounds in which $C_y$ has the following meaning:

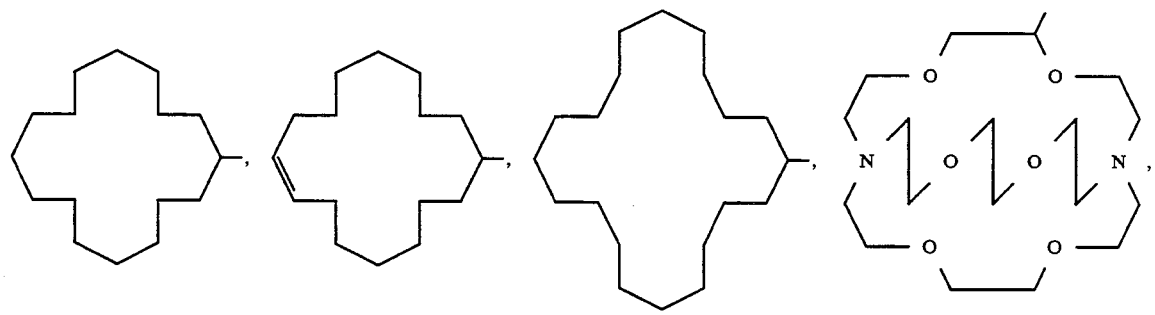

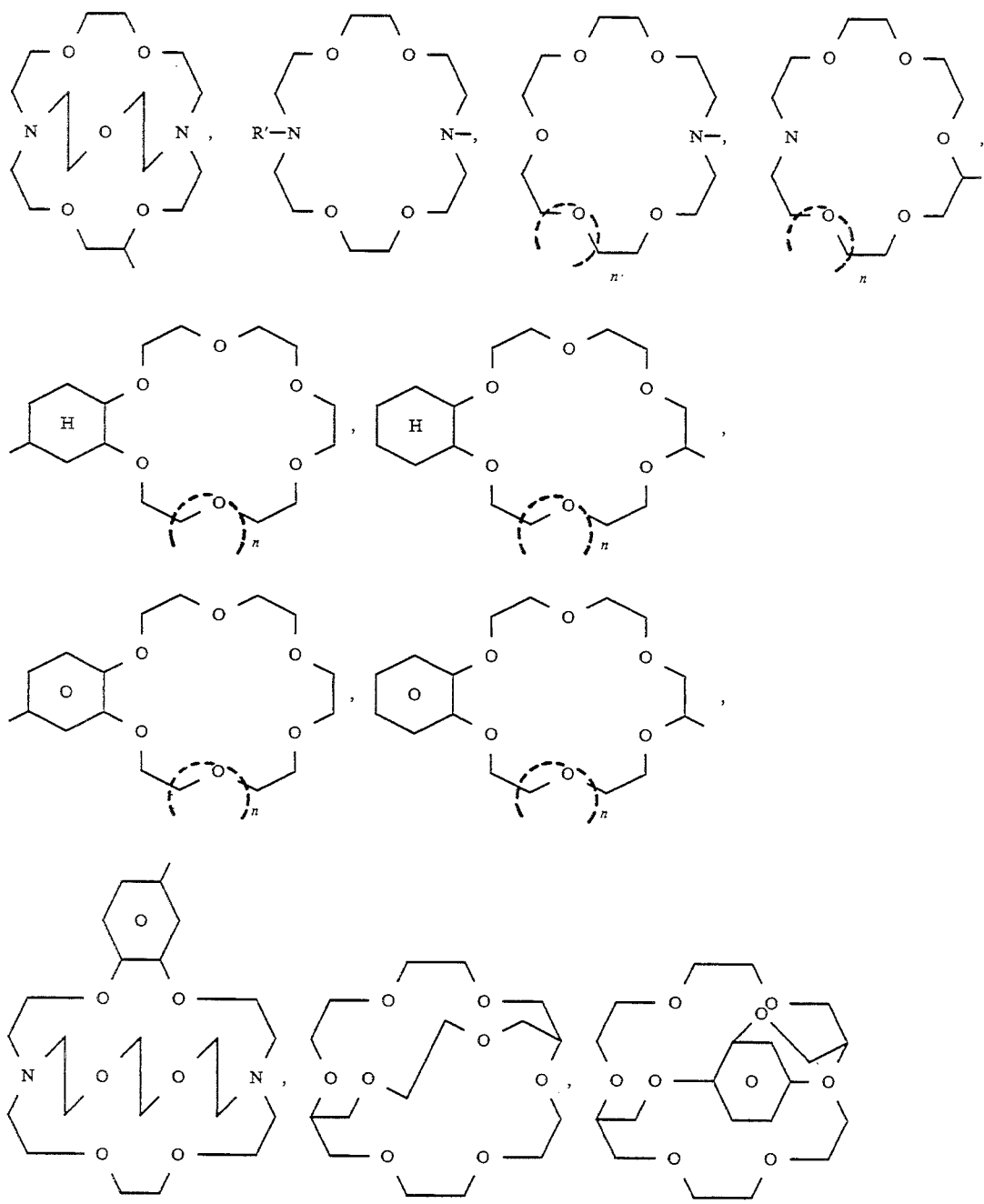
n is 0, 1 or 2.
Extremely preferred compounds are those in which $C_y$ is:
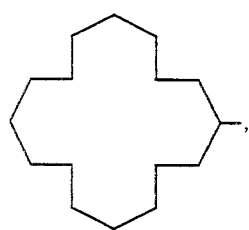
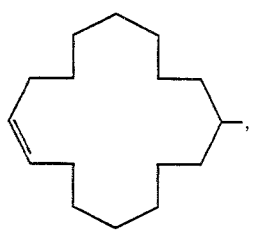

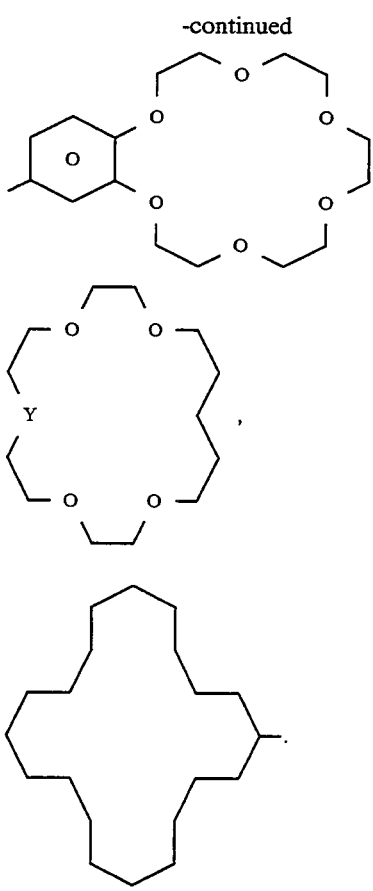

G is —O—(CH₂)ₘ— or —(CH₂)ₘ—,
Y is —O—, N-alkyl or N-aryl, and
R_g is —CO₂R', —N=C=O, —Si(CH₃)₂OR', —NH₂ or —OH.

II Physisorption

The compounds providing the amphiphilicity are held at the surface of the alignment layer molecules by weaker or stronger intermolecular attractive forces. The strength of the coupling to the surface can be increased by introducing polar or polarizable groups.

The positive effect of the compounds providing the amphiphilicity on the alignment layer is significantly increased by liquid-crystal mixtures which likewise contain these compounds, in particular coronands and cryptands.

In the displays, the alignment layer treated according to the invention has the effect, in particular, of suppressing twist states and ghost images and thus improving the optical contrast.

Furthermore, the amphiphilic alignment layer can be used to produce a highly stable liquid-crystal switching and display device. By adding the compounds to be employed according to the invention, in particular coronands and cryptands, to alignment layers, the FLC mixtures can be converted into a uniform and twist-free "bookshelf" or "quasi-bookshelf" alignment by applying a continuous periodic electrical voltage (explanation of terms: Dübal et al., Proc. 6th Intl. Symp. on Electrets, Oxford, England (1988); Y. Sato et al., Jap. J. Appl. Phys. 28, L 483 (1989)).

Shock-damaged liquid-crystal displays can be regenerated if the amphiphilicity-providing substances are used in alignment layers by applying a continuous periodic voltage, as has already been proposed on use of these substances in FLC mixtures (German Patent Application P 40 11 805).

The invention is described in greater detail by the examples:

EXAMPLES

Example 1

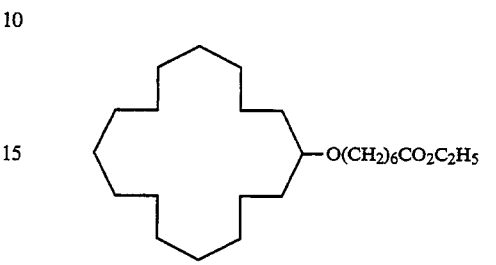

A mixture of 15 ml of 8-cyclohexadecen-1-one, 10 ml of trimethyl orthoformate and 0.1 g of benzenesulfonic acid is warmed at 60° C. for 2 hours; the methyl formate which forms is removed by distillation. Excess trimethyl orthoformate is subsequently removed by distillation at 120° C. for 1 hour.

10 ml of 6-chloro-1-hexanol are added, and the mixture is heated at 120 ° C. for 1 hour, during which methanol distills off. Distillation gives 18 g of a viscous, yellowish oil of boiling point 140°–165° C./0.05 mbar, a mixture of isomeric cyclohexadienyl 6-chlorohexyl ethers.

Hydrogenation (80° C./100 bar) in THF with palladium catalysis gives cyclohexadecyl 6-chlorohexyl ether.

5 g of this compound are heated at 150° C. for 2 days with 2 g of NaCN and 0.5 g of KI in 50 ml of DMF. Aqueous work-up and extraction with dichloromethane gives 5 g of 6-cyanohexyl cyclohexadecyl ether.

HCl gas is bubbled through a solution of this compound in 100 ml of ethanol at −10° C. until the solution is saturated. Excess HCl is expelled at 0° C. in a stream of nitrogen, and the pH is adjusted to 2 by adding concentrated NaOH, with the pH being monitored using a glass pH electrode. The crystal slurry obtained is transferred into 150 ml of H₂O and extracted with dichloromethane. The extract after chromatographic purification gives 1.5 g of a colorless oil comprising.

Example 2

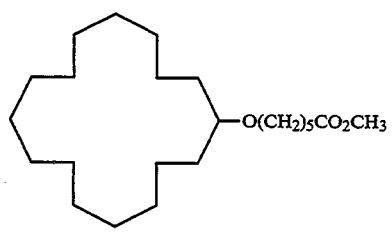

is obtained analogously to Example 1.

Example 3

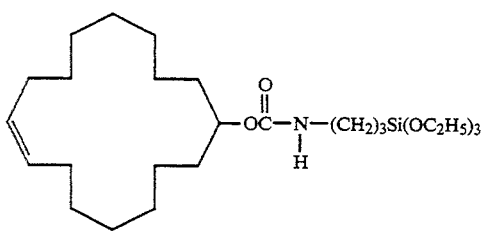

0.9 g of 8-cyclohexadecen-1-ol, prepared by reducing 8-cyclohexadecen-1-one using NaBH$_4$ in ethanol, is treated with 1 ml of 3-isocyanatopropyltriethoxysilane and 50 mg of triethylamine, and the mixture is kept at 80° C. for 24 hours. The low-boiling components are removed at 90° C./0.1 mbar. The residue solidifies on cooling to give a wax, whose IR spectrum contains only traces of an isocyanate band, but instead a strong band (1700 cm$^{-1}$) due to the

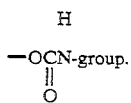

$^1$H-NMR: δ=3.1 (q, 2H, —NHCH$_2$); 4.8 (m,1H,

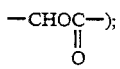

5.2 (m, 2H, —CH=CH—); 0.6 (m, —CH$_2$Si).

According to GLC, the compound has an (extrapolated) boiling point of 427° C.

Example 4

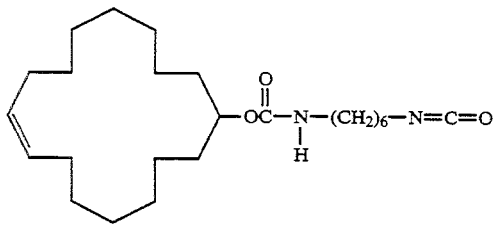

1 g of 8-cyclohexadecen-1-ol, prepared as in Example 3, is heated at 80° C. for 24 hours together with 5 ml of 1,6-hexamethylene diisocyanate and 0.1 ml of triethylamine. The low-boiling components are removed at 110° C./0.1 mbar. The IR spectrum of the residue, 1.55 g of viscous oil, has bands of equal intensity at 2260 (isocyanate) and 1700 cm$^{-1}$ (—OCNH—).

Example 5

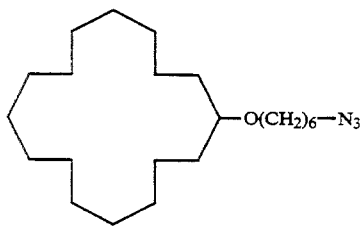

A solution of 4 ml of 6-chlorohexyl cyclohexadecyl ether, prepared as described in Example 1, in 20 ml of DMF is heated at 50° C. for 48 hours with 2 g of NaN$_3$ and 0.5 g of KI. 100 ml of H$_2$O are added, and the mixture is extracted four times with 25 ml of dichloromethane in each case.

The extract is purified by chromatography (silica gel, dichloromethane), giving 1.24 g of a colorless liquid which has an intense azide band at 2090 cm$^{-1}$ in the IR spectrum and a multiplet, representative of 5 protons relative to the remainder of the aliphatic protons at 1.3 ppm, at δ=3.1–3.4 in the $^1$H-NMR spectrum. An extrapolated boiling point of 396° C./1000 mbar can be determined from the GLC.

Example 6

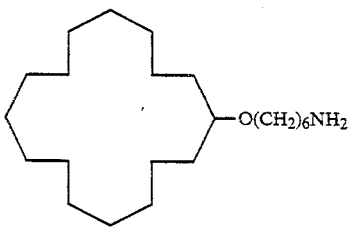

4 ml of 6-chlorohexyl cyclohexadecyl ether, prepared as described in Example 1, is heated at 130° C. for 20 hours in an autoclave with 40 ml of concentrated aqueous ammonia solution and 0.1 g of KI. After cooling, the mixture is transferred into 100 ml of 2N Na$_2$CO$_3$ solution and extracted three times with 50 ml of dichloromethane in each case, Distillation of the extract gives 1.8 g of product; $^1$H-NMR: δ=3.3 (m, 3H, —CHCH$_2$—); 2.75 (t, 2H, —CH$_2$NH$_2$)

Example 7

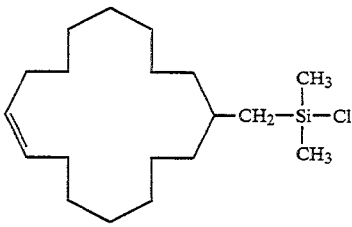

10.7 g of triphenylmethylphosphoniumbromide are added at room temperature to a mixture of 20 ml of n-butyllithium (1.55 molar in hexane) and 60 ml of diethyl ether. After the mixture has been kept at room temperature for 4 hours, 7.3 g of 8-cyclohexadecen-1-one are added dropwise, and the mixture is refluxed for 18 hours. The mixture is filtered, the solvent is removed by distillation, and the residue is purified by chromatography (SiO$_2$, hexane/ethyl acetate 95:5), giving 2.5 g of 1-methylene-8-cyclohexadecene, identified from the $^1$H-NMR spectrum: δ=5.2 (t, —CH=CH—); δ=4.75 (s, C=CH$_2$).

2.5 g of the above compound are warmed at 60° C. for 24 hours in a pressure vessel with 2.0 ml of dimethylchlorosilane and 0.5 ml of divinylplatinum/tetramethyldisiloxane complex (10% in xylene). Distillation gives 3.1 g of product of boiling point 105°–110° C./0.01 mbar; $^1$H-NMR: δ=5.2 (m, 2H, —CH=CH—); 0.85 (m, 2H, —CH$_2$Si); 0.3 (s, 6H, —CH$_3$).

Example 8

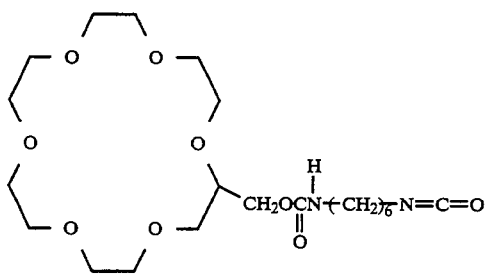

A mixture of 0.6 g of hydroxymethyl-18-crown-6 (prepared by the method of Montanari and Tundo, THL 1979, 5055), 2.0 ml of 1,6-diisocyanatohexane and 50 mg of triethylamine is heated at 80° C. for 24 hours. The low-boiling components are removed at 100° C./0.1 mbar. The IR spectrum of the residue, 0.8 g of a viscous oil, has bands of equal intensity at 2260 (isocyanate) and 1700 cm$^{-1}$ (carbamate). The GLC gives an extrapolated boiling point of 444° C./1000 mbar.

Example 9

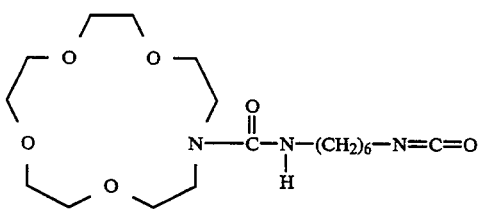

is prepared analogously to Example 8.

Example 10

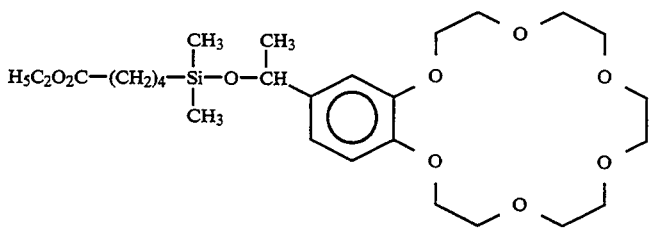

1 g of benzo-18-crown-6 is added to a solution of 0.43 ml of acetic anhydride and 0.69 ml of acetic acid in 10 ml of polyphosphoric acid, and the mixture is stirred at 70° C. for 2 hours. 65 g of ice are added, and the mixture is stirred for a further 2 hours. The organic phase obtained after extraction five times with dichloromethane is evaporated to dryness, and the residue is boiled with heptane. 0.7 g of the acetyl compound of melting point 77° C. are obtained from the heptane phase.

A solution of 1.6 g of the above acetyl compound in 90 ml of ethanol is treated with 0.33 g of NaBH$_4$, and the mixture is stirred at 20° C. for 3 hours. Customary working-up gives 1.4 g of the hydroxyethyl compound.

A solution of 1.4 g of this hydroxyethyl compound in 5 ml of DMF is treated at 20° C. successively with 1.06 g of ethyl 5-(chlorodimethylsilyl)pentanoate and 0.53 g of imidazole, and the mixture is stirred at 50° C. for 7 hours. The mixture is cooled and poured into 20 ml of ice-cold 20% strength citric acid solution. The mixture is extracted 4 times with dichloromethane, the extract is washed with citric acid solution and with saturated sodium chloride solution and dried, and the solvent is evaporated. Chromatographic purification gives 0.7 g of product. Characteristic signals in the $^1$H-NMR: $\delta = 0.1$–$0.5$ (m, 8H, Si-CH$_3$+Si-CH$_2$); 1.3 (t, 3H, —CH$_2$CH$_3$).

Example 11

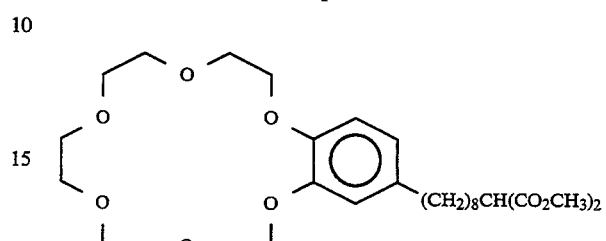

Benzo-18-crown-6 is converted into the corresponding 6-bromohexanoylbenzo-18-crown-6 analogously to Example 10 using 6-bromohexanoic acid.

4.5 mmol of this compound are dissolved in 35 ml of trifluoroacetic acid, and 1.8 ml of triethylsilane are added. After the mixture has been kept at room temperature for 48 hours, water and dichloromethane are added, and the organic phase is separated off and dried. The solvent and hexaethylsiloxane are removed in vacuo.

1 hour after 2.1 mmol of NaH have been added to a solution of 2.1 mmol of dimethyl malonate in 30 ml of methanol, 2.1 mmol of the above ω-bromooctylbenzo-18-crown-6 are metered in. The mixture is kept at 70° C. for 4 hours and evaporated, and the residue is distributed between H$_2$O and dichloromethane. The organic phase is purified by chromatography. Characteristic signals in the $^1$H-NMR spectrum: $\delta = 2.5$ (t, br, 2H, aryl-CH$_2$—); 3.4 (m, 3H, —CH(CO$_2$CH$_3$)$_2$+—CH$_2$CH(CO$_2$CH$_3$)$_2$).

Example 12

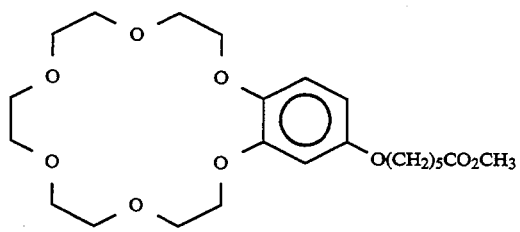

2 mmol of NaH are added to 1 mmol of hydroxybenzo-15-crown-5 dissolved in 20 ml of DMF. After 30 minutes, a solution of 1.3 mmol of methyl 5-bromohexanoate in 4 ml of DMF is added, and the mixture is heated at 60° C. for 4 hours. HCl is added until the mixture is neutral, the solvent is evaporated, the residue is taken up in water/dichloromethane and the organic phase is purified by chromatography. The ¹H-NMR and IR spectra of the resultant oil correspond to the above structure.

Example 13

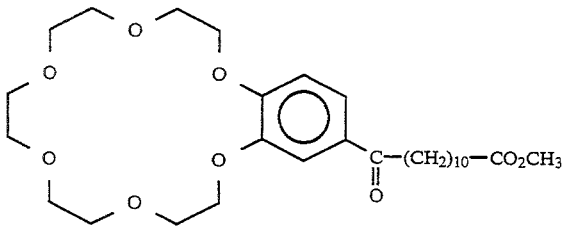

Benzo-18-crown-6 and methyl 11-cyanoundecanoate are reacted in polyphosphoric acid as described in Example 10.

The ω-cyanoundecanoylbenzo-18-crown-6 obtained is converted into the target compound as described in Example 1 using HCl in ethanol.

Example 14

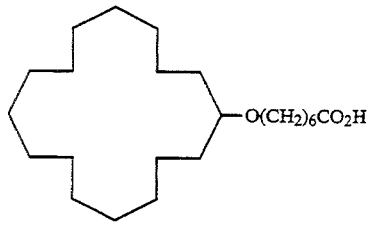

5 g of the nitrile, prepared as described in Example 1, are heated at the boiling point for 48 hours with 10 ml of concentrated NaOH and 20 ml of ethylene glycol. The mixture is added to 50 ml of H₂O, and the pH is adjusted to 1 using HCl. Extraction with diethyl ether gives 4.1 g of a viscous oil, which is purified by chromatography (silica gel, dichloromethane/ethyl acetate 9:1), giving 3.2 g of a oil with a band at 1710 cm⁻¹ (—COOH) in the IR spectrum. According to GLC, the substance has an extrapolated boiling point of 413° C./1000 mbar.

Example 15

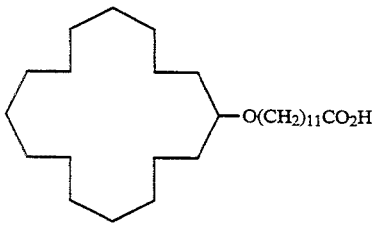

6 ml of 8-cyclohexadecen-1-one and 4 ml of trimethyl orthoformate are reacted as described in Example 1.

5 g of 12-hydroxydodecane-1-carboxylic acid are added at 120° C., and, after 1 hour, the low-boiling components are removed at 120° C./0.1 mbar. The residue which crystallizes on cooling is hydrogenated at 80° C./100 bar in 50 ml of THF using 0.2 g of Pd/C and purified by chromatography (silica gel, dichloromethane), giving 3.5 g of a colorless oil having an extrapolated (according to GLC) boiling point of . . . °C./1000 mbar.

Example 16

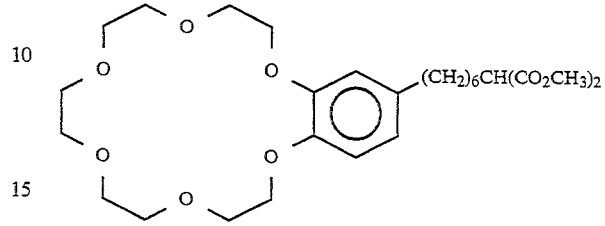

is prepared analogously to Example 11; boiling point, extrapolated from the GLC, 437° C./1000 mbar.

Example 17

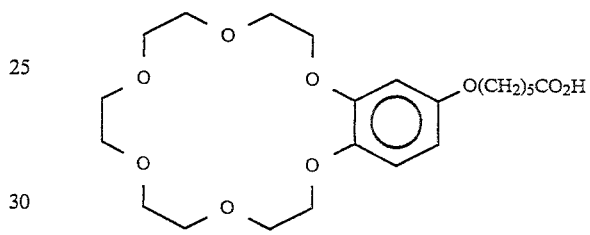

is obtained from Example 12 as a colorless oil by hydrolysis with ethanolic KOH, acidification with HCl, extraction with dichloromethane and chromatographic purification (RP-18, dichloromethane/methanol 97.3).

Construction of Test Cells

To demonstrate the advantageous properties of the FLC displays according to the invention, test cells were produced, filled with ferroelectric liquid-crystal mixtures and then tested. To this end, glass plates coated with a 4×4 mm² electrode area of indium-tin oxide (ITO) were cleaned with an aqueous surfactant solution and subsequently with ethanol and then coated either with a wet film of a solution of a polyamidecarboxylic acid solution in N-methylpyrrolidone (NMP) or with an aqueous solution of a polyvinyl alcohol (PVA). The coating was effected using a "spin coater", but can also be carried out using other methods, for example printing or immersion. The alignment layer is then rubbed with a velour-like fabric, and the glass plates are bonded together to produce the finished test cells.

In the examples below, the substances which reduce the hydrophilic properties of the alignment layer are applied to or in the polymeric alignment layer, preferably in three ways:

A) Mixing the substances providing the amphiphilicity into the solution of the monomeric precursors of the alignment layer material or mixing into dissolved polymeric alignment layer materials and spin-coating with these solutions, and then polymerizing the monomeric precursors.

B) Spin-coating the monomeric alignment layer precursor or polymeric alignment layer materials and subsequently coating with the substances providing the amphiphilicity and containing reactive groups which permit chemical bonding to the alignment layer. In the monomeric alignment layer precursors (for example the polyimides), the chemical bonding may compete with the imidation reaction. If pre-polymerized alignment layers are used, free functionalities must, by contrast, additionally be provided in the polymer (for example free carboxyl, hydroxyl or ester groups).

C) Spin-coating the compounds providing the amphiphilicity onto the already applied and rubbed orientation layer. The adhesion is in this case based on physical-type interactions.

The glass plates were subsequently bonded together with the rubbing directions parallel and using spacers to give liquid-crystal test cells with a plate separation of 2.0 μm. The test cells thus obtained were investigated for their electrooptical parameters with a number of different amphiphilicity-providing substances.

In case B, the rubbing information is introduced after the additional layer has been applied, while in case C, the rubbing precedes the application of the additional substances.

The compounds below are examples of substances applied (as an additional layer) to the alignment layer in the display according to the invention.

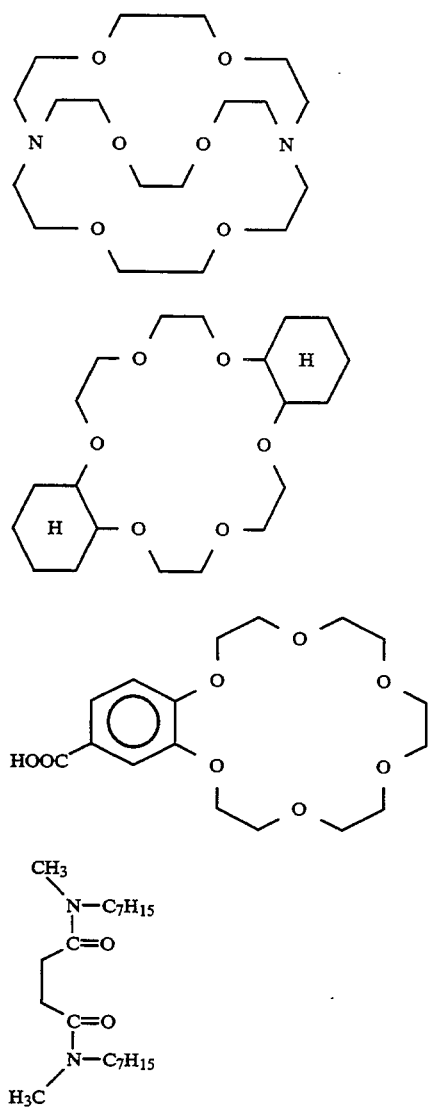

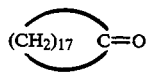

Z 5

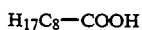

Z 6

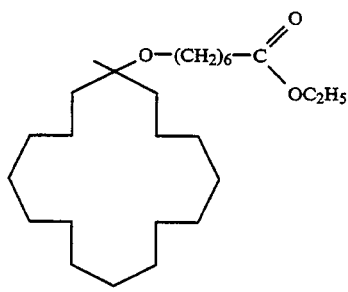

Z 7

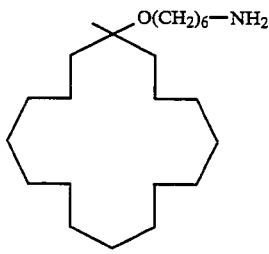

Z 8

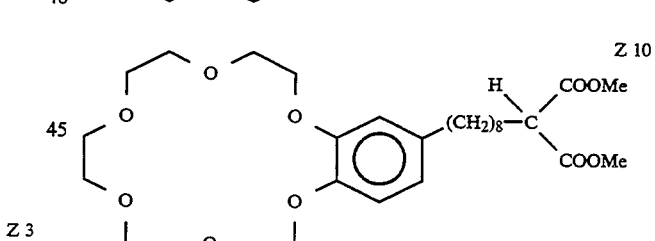

Z 9

Z 10

An example of an alignment layer on which the display according to the invention is based is a layer made from a polyimide obtained from the following precursors by polymerization (see Encyclopedia of Polymer Science and Engineering, 2nd Ed., Vol. 12, pp. 364–383, John Wiley & Sons, New York, 1988, Eds. H. F. Mark, N. M. Bikalis, C. G. Overberger and G. Menges)

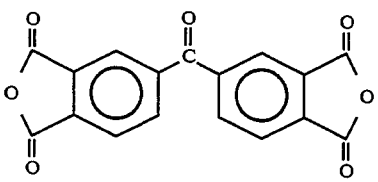

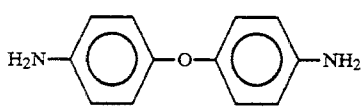
or a polyvinyl alcohol
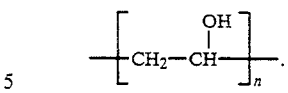
The FLC mixture M1 employed had the following composition (in mol %):
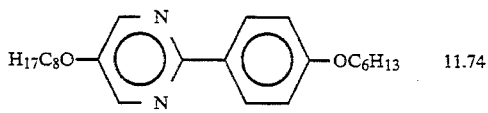 11.74
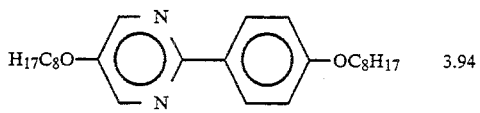 3.94
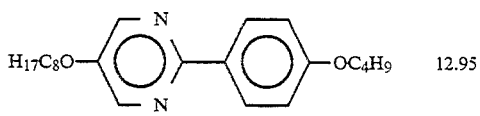 12.95
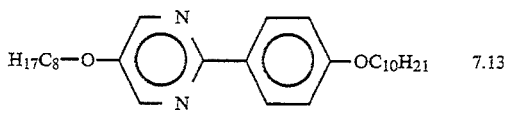 7.13
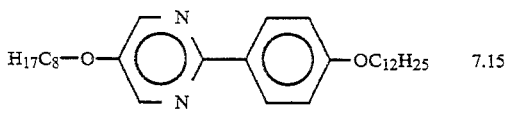 7.15
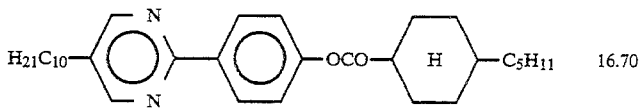 16.70
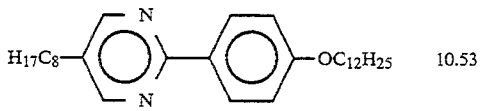 10.53
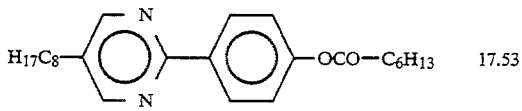 17.53
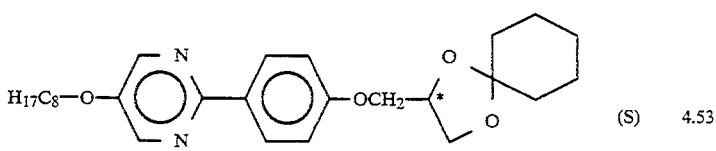 (S) 4.53
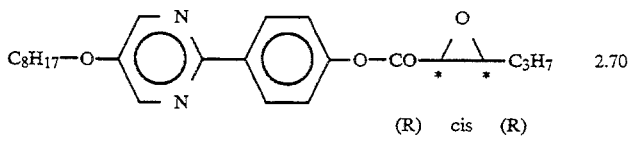 2.70
(R) cis (R)
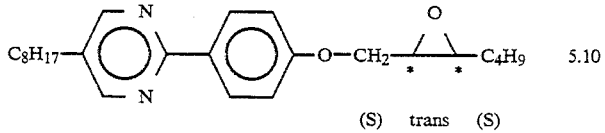 5.10
(S) trans (S)

and the phase sequence $S_C$*69.8 $S_A$*75N* 89.1 I, with a spontaneous polarization of 30 nC·cm$^{-2}$ at a temperature of 20° C.
The FLC mixture M2 employed had the following composition (in mol %):
99 mol % of FLC mixture M1
1 mol % of
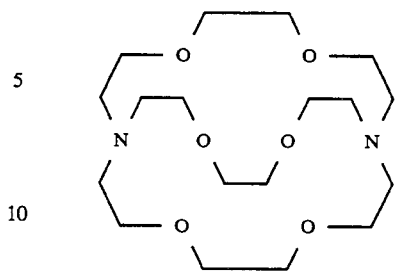
and the phase sequence $S_c$*61 $S_A$*65N* 85 I, with a spontaneous polarization of 26 nC·cm$^{-2}$ at a temperature of 20 ° C.
The FLC mixture M3 had the composition (in mol %)
12.28 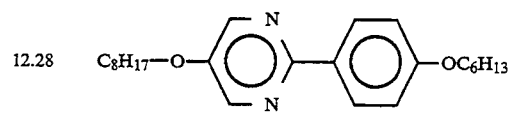
4.13 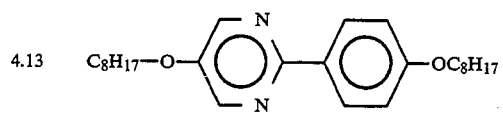
13.56 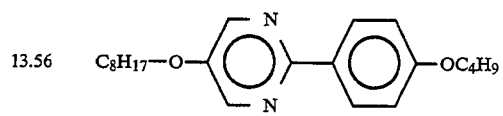
7.45 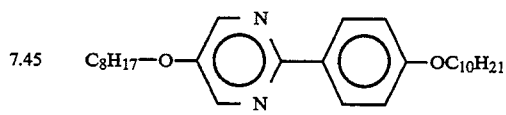
7.48 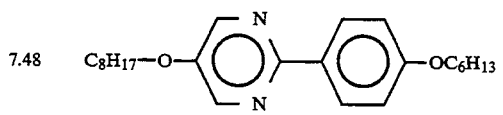
17.46 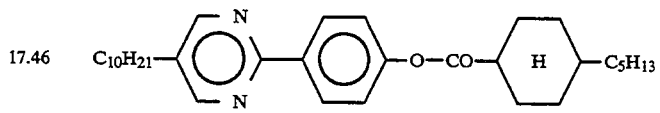
11.00 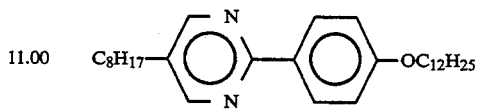
18.34 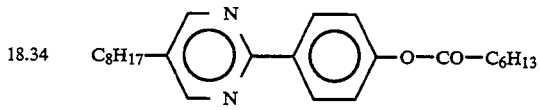
7.00 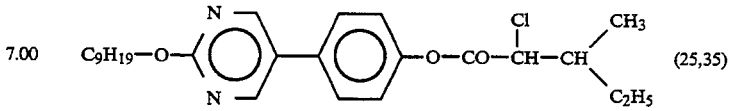 (2S,3S)

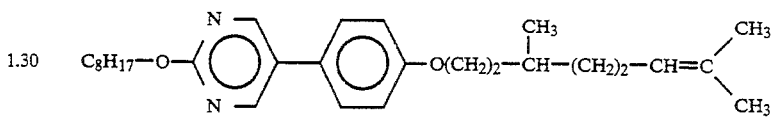

and the phase sequence with a $S_C^*69\ S_A^*75N^*\ 82\ I$, with a spontaneous polarization of $-9.6$ nC·cm$^{-2}$.

Use Example 1

The measurements relate to a display with admixed additives (as described under A), the compounds providing the amphiphilicity having been added to the dissolved precursors of a polyimide alignment layer. To this end, the polyimide precursors were treated with in each case 10% by weight of Z2 or 5% by weight of Z5 (based on the solids content), and the mixture was used to prepare a 2.5% strength solution in N-methylpyrrolidone. This solution was then applied to glass plates by spin coating, and the plates were coated with ITO electrodes. The plates were heated at a temperature of 200° C. for 1-2 hours to polymerize the mixture and subsequently imidate the polymer to give the polyimide. The glass plates were rubbed, and the substrates were bonded together to give the finished test cells. The cell thickness of 2 μm was set using glass spacers.

The switching angles of the FLC mixture M2 in the test cells according to the invention and in conventional test cells (E. H. C. Co. Ltd., Tokyo) in the chevron geometry are shown in Table 1.

TABLE 1

| Measurement cell | Switching angle (2 $\theta_{eff}$) |
|---|---|
| Reference cell | 16° |
| Cell containing Z2 | 20° |
| Cell containing Z5 | 22° |

In the test cells according to the invention, the FLC mixture with an amphiphilic alignment layer has significantly greater switching angles, resulting in greater brightness in the bright state. In parallel, the transmission in the dark state is reduced, i.e. the optical contast is significantly improved.

Use Examples 2-5 relate to the subsequent application of the additional layer (as described under B) and chemical bonding to the alignment layer.

Use Example 2

The polyimide of Use Example 1 was incompletely imidated, leaving free functional groups for bonding to the compounds providing the amphiphilicity. The pre-imidation at a temperature of 100° C. was carried out for a few seconds for compounds Z3 and Z6, while the pre-imidation was carried out for 20 minutes for Z5. in each case, a 3% strength solution of one of the compounds in methyl ethyl ketone was spin-coated onto the glass plates of the test cells, and the plates were then conditioned at 200° C. for 1 hour in order to complete the imidation of the alignment layer and to chemically bond the additional layer.

FLC mixture M2 was introduced into the SSFLC cells according to the invention, and the measurement results were compared with those for conventional test cells (all cells contained the chevron geometry).

To this end, in addition to the switching angle (2 $\theta_{eff}$), the ratio between the areas of very dark uniform regions and the bluish "twist" regions in the test cells was employed for characterization purposes.

The corresponding results are shown in Table 2.

TABLE 2

Characterization of the test cells with a spin-coated, chemically bonded additional layer in the chevron gemoetry)

| Measurement cell | Switching angle-(2 $\theta_{eff}$) | Area ratio uniform/twist structure |
|---|---|---|
| Reference cell | 16° | 0.05 |
| Cell containing Z5 | 21° | 4 |
| Cell containing Z3 | 18° | 1.5 |
| Cell containing Z6 | 23° | 2 |

In this example too, the test cells according to the invention exhibit greater switching angles and significantly lower area percentages containing twist regions (which are known to reduce the contrast).

Use Example 3

The polyimide of Use Example 1 was fully imidated at 300° C. and treated with additive Z8, dissolved in isopropanol, by spin-coating. Chemical bonding was then carried out by warming the substrate (30 minutes at 180° C.). The excess, unbonded additive was washed off with plenty of isopropanol in an ultrasound bath. Otherwise, the test cells were constructed in the manner described above.

The test cells containing the alignment layer according to the invention were characterized using mixtures M1 and M3, and the measurement results were compared with those obtained for cells without an additional layer. All the cells contained the chevron geometry.

Here too, the switching angle 2 $\theta_{eff}$ and the area ratio between the very dark uniform regions and bluish twist regions in the test cells were used for characterization purposes. The results are shown in Table 3.

TABLE 3

Test cells containing a spin-coated, chemically bonded additional layer Z8 in the chevron geometry:

| | Switching angle (2 $\theta_{eff}$) | Area ratio uniform/twist structure |
|---|---|---|
| M1 reference cell | 15° | 0 |
| cell containing Z8 | 22° | 19 |
| M3 reference cell | 17° | 0 |
| cell containing Z8 | 23° | 100 |

Table 3 illustrates the advantages of the additives. Both the increase in the switching angle and the appearance of a uniform dark state provide high brightness in the bright state and high optical contrast.

Use Example 4

A 1.5% strength aqueous solution of a polyvinyl alcohol was spin-coated onto glass plates coated with ITO electrodes. The wet polymer film was then dried at a temperature of 180° C. In a further step, additive Z7, which contained small amounts of free acid and was dissolved in isopropanol, was spin-coated onto the plates. The chemical bonding was produced by warming to 180° C. After the cell substrates had been rubbed, they were bonded together to give the test cells used.

The test cells were characterized using mixtures M1 and M2. The measurement results with mixture M1 in the chevron geometry are shown in Table 4.

TABLE 4

Test cell containing a spin-coated, chemically bonded additional layer Z7 in the chevron geometry

| | Switching angle (2 $\theta_{eff}$) | Area ratio uniform/twist structure |
|---|---|---|
| Reference cell | 14° | 0 = 100% twist structure |
| Cell containing Z7 | 21° | ∞ = 100% uniform structure |

The advantage of the alignment layer according to the invention is particularly clear in the bookshelf geometry. To this end, the cell containing Z7 and the reference cells (E. H. C. Co. Ltd., Tokyo), filled with FLC mixture M2, were subjected to a rectangular voltage of 10 Hz at an amplitude of about 10–15V/μm (see R. Dübal et al. in "Proceedings of the 6th Intl. Symp. on Electrets", Oxford, England, 1988, Eds. D. K. Das-Gypra and A. W. Pattullo) in order to produce the desired structure.

The cells were addressed at room temperature with a program comprising bipolar switching pulses. The cell was placed under a polarizing microscope with a photodiode in the ray path. The measurement parameter used was the optical contrast. By varying the pulse amplitudes, the maximum possible ratio between switching pulse amplitude and data pulse amplitude (=maximum bias) can be determined in this addressing program for multiplex mode. This ratio should be as high as possible, since only at low data pulse amplitude does correspondingly high contrast become possible. Table 5 shows the maximum bias values and the optical contrast for the addressing described above.

TABLE 5

Optical contrast and maximum bias of FLC mixture M2 in cells containing additive Z7 and in corresponding reference cells (without additive). The results relate to the bookshelf geometry.

| | Maximum bias | Contrast (B = 6.5) |
|---|---|---|
| Reference cell | 5 | 8 |
| Cell containing Z7 | 6.5 | 60 |

Use Example 5

Additives Z9 and Z10 were bonded to a polyvinyl alcohol as described in Use Example 4.

The test and reference cells were filled with mixture M3, and the switching angle and the formation of the uniform structure in the chevron geometry were used to characterize the cells. The results are shown in Table 6.

TABLE 6

Ratio between uniform and twist structures and the effective switching angle of FLC mixture M3 in cells containing a Z9/Z10 additional layer and in a reference cell without additives. The results relate to the chevron geometry.

| | Switching angle 2 $\theta_{eff}$ | Area ratio uniform/twist structure |
|---|---|---|
| Reference cell | 17° | 0 |
| Cell containing Z9 | 25° | ∞ = 100% uniform structure |
| Cell containing Z10 | 26° | ∞ = 100% uniform structure |

The use of additives Z9 and Z10 made it possible to produce entirely the uniform structure. In addition, a significant increase in the switching angle can be seen, which improves both the brightness in the bright state and the optical contrast.

For further investigations, FLC mixture M1 was introduced into test cells containing additive Z10 and corresponding reference cells (E. H. C. Co. Ltd., Tokyo). The cells were treated with a rectangular field at a frequency of 10 Hz and an amplitude of 10–15 V/μm in order to produce the bookshelf geometry. The cells were addressed at room temperature with the program described in Use Example 4, and the maximum possible bias and the optical contrast were employed to characterize the cells. The results are shown in Table 7.

TABLE 7

| | Maximum bias | Contrast (B = 4) |
|---|---|---|
| Reference cell | not measurable | 1 |
| Cell containing Z10 | 4 | 30 |

The above-described surface memory effect means that the reference cell cannot be switched using this addressing program, since FLC mixture M1 does not contain any complex ligands for ions. The optical contrast is thus one, with the same transmission in the bright and dark states.

By contrast, the test cell containing additive Z10 can be switched, even if it contains FLC mixtures containing no complex ligands for ions. The chemically bonded crown ether suppresses not only twist states which adversely affect the optical contrast, but also eliminates the surface memory effect and thus results in a drastic improvement in the optical contrast and in the switching behavior.

Use Example 6

The experiments describe the application of the intermediate layer to the pre-rubbed alignment layer (see point C). To this end, the precursors of the polyimide of Use Example 1 were dissolved in N-methylpyrrolidone and applied to the glass substrates by spin-coating. Imidation was subsequently effected for 3 hours at a temperature of 200° C., and the polyimide surface was then rubbed with a rubbing machine.

The additives were likewise applied by spin-coating of a 0.5% strength by weight solution in acetone. After the additional layers, comprising Z1 or Z4, had been dried, the glass substrates were bonded together to give the finished test cells.

The test cells according to the invention were again characterized using the tilt angle ($\theta_{eff}$). Table 8 shows the results for FLC mixture M1.

TABLE 8

| Results obtained using test cells containing a physically bonded additional layer | |
|---|---|
| Measurement cell | Switching angle (2 $\theta_{eff}$) |
| Reference cell | 16° |
| Cell containing Z1 | 23° |
| Cell containing Z4 | 25° |

We claim:

1. A ferroelectric liquid-crystal display device of high contrast and brightness comprising a ferroelectric liquid-crystal layer which is surrounded on both sides by layers which are, in sequence starting from the ferroelectric liquid-crystal layer, at least one alignment layer, electrodes and outer plates and also at least one polarizer, wherein the alignment layer comprises within the layer, as a mixture component of the material of the alignment layer, or at the surface, as an additional layer between the alignment layer and the ferroelectric liquid-crystal layer, a component which renders the alignment layer amphiphilic.

2. A liquid-crystal display as claimed in claim 1, wherein the component which renders the alignment layer amphiphilic is an additional layer between the alignment layer and the ferroelectric liquid-crystal layer.

3. A liquid-crystal display as claimed in claim 1, wherein the component which renders the alignment layer amphiphilic has been added to the material of the alignment layer as a mixture component.

4. A liquid-crystal display as claimed in claim 2, wherein the component which renders the alignment layer amphiphilic is linked to the material of the alignment layer by a chemical reaction.

5. (Amended) A liquid-crystal display as claimed in claim 1, wherein the alignment layer comprises a compound selected from the group consisting of a polyimide, polyamide and polyvinyl alcohol.

6. (Amended) A liquid-crystal display as claimed in claim 1, wherein the alignment layer contains a compound selected from the group consisting of a polyamide, polyimide and polyvinyl alcohol and at least one compound selected from the group consisting of a macrocyclic compound, a cryptand, a coronand, a podand, a mercapto compound and an ionophoric compound.

7. A liquid-crystal display as claimed in claim 6, wherein the alignment layer contains from 0.01 to 50% by weight of a compound selected from the group consisting of a macrocyclic compound, a cryptand, a coronand, a podand, a mercapto compound and an ionophoric compound.

8. A liquid-crystal display as claimed in claim 1, which additionally contains an insulation layer of high dielectric constant between the electrodes and the alignment layer.

9. A liquid-crystal display as claimed in claim 1, wherein the FLC medium also contains a compound having an amphiphilicity-providing effect.

10. A liquid-crystal display as claimed in claim 7, wherein the alignment layer contains from 0.1 to 25% by weight of a compound selected from the group consisting of a macrocyclic compound, a cryptand, a coronand, a podand, a mercapto compound and an ionophoric compound.

* * * * *